United States Patent
Islam et al.

(10) Patent No.: US 10,736,083 B2
(45) Date of Patent: Aug. 4, 2020

(54) SYSTEMS AND METHODS FOR DOWNLINK CONTROL CHANNEL SIGNALING FOR UPLINK TRANSMISSION

(71) Applicant: Huawei Technologies Co., Ltd., Shenzhen (CN)

(72) Inventors: Toufiqul Islam, Ottawa (CA); Mohamed Adel Salem, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 171 days.

(21) Appl. No.: 15/960,677

(22) Filed: Apr. 24, 2018

(65) Prior Publication Data

US 2018/0317213 A1    Nov. 1, 2018

Related U.S. Application Data

(60) Provisional application No. 62/492,685, filed on May 1, 2017.

(51) Int. Cl.
*H04W 72/04* (2009.01)
*H04L 1/18* (2006.01)
(Continued)

(52) U.S. Cl.
CPC ....... *H04W 72/0406* (2013.01); *H04L 1/0003* (2013.01); *H04L 1/0028* (2013.01);
(Continued)

(58) Field of Classification Search
None
See application file for complete search history.

(56) References Cited

U.S. PATENT DOCUMENTS 9,363,799 B2 * 6/2016 Park ................. H04L 1/0026
9,603,091 B2 * 3/2017 Baldemair ............ H04L 1/0026
(Continued)

FOREIGN PATENT DOCUMENTS

CN    103178942 A    6/2013
CN    106470093 A    3/2017
(Continued)

OTHER PUBLICATIONS

U.S. Appl. No. 62/446,188, filed Jan. 13, 2017, "System and Method on Transmission Adaptation for Uplink Grant-Free Transmission", "Zhang, Liqing, et al", pp. 1-46.
(Continued)

*Primary Examiner* — Robert M Morlan
(74) *Attorney, Agent, or Firm* — Slater Matsil, LLP

(57) ABSTRACT

A user equipment (UE) in a wireless communication system may be configured to use particular resources to send one or more uplink transmissions. However, sometimes during operation the particular resources the UE is configured to use are not well suited to the channel conditions at that time or result in interference or collision with other uplink transmissions. Systems and method are disclosed in which downlink control information (DCI) may be used to reconfigure one or more resources used by the UE for an uplink transmission. In some embodiments, resource reconfiguration instructions are sent by the base station along with hybrid automatic repeat request (HARQ) feedback. In some embodiments, a unified downlink signaling format is disclosed that may be used for UEs having different capabilities, with the bits of the unified downlink signaling relaying different instructions to different UEs depending upon the capability of the UE.

28 Claims, 25 Drawing Sheets

(51) Int. Cl.
*H04W 72/14* (2009.01)
*H04L 1/00* (2006.01)
*H04L 1/16* (2006.01)
*H04L 5/00* (2006.01)

(52) U.S. Cl.
CPC .......... *H04L 1/0041* (2013.01); *H04L 1/0045* (2013.01); *H04L 1/1614* (2013.01); *H04L 1/188* (2013.01); *H04L 1/189* (2013.01); *H04L 1/1812* (2013.01); *H04L 1/1864* (2013.01); *H04W 72/14* (2013.01); *H04L 1/0061* (2013.01); *H04L 5/0048* (2013.01); *H04L 5/0055* (2013.01)

(56) References Cited

U.S. PATENT DOCUMENTS

| | | | | |
|---|---|---|---|---|
| 9,807,746 | B2* | 10/2017 | Lee | H04L 1/1861 |
| 10,425,942 | B2* | 9/2019 | Ahn | H04W 74/0808 |
| 2013/0114570 | A1* | 5/2013 | Park | H04L 5/0053 370/335 |
| 2015/0098418 | A1 | 4/2015 | Vajapeyam et al. | |
| 2018/0206246 | A1 | 7/2018 | Zhang et al. | |

FOREIGN PATENT DOCUMENTS

| | | |
|---|---|---|
| CN | 106559198 A | 4/2017 |
| EP | 2555461 A2 | 2/2013 |
| EP | 3355506 A1 | 8/2018 |

OTHER PUBLICATIONS

R1-1705785 Institute for Information Industry (III), "On Uplink Grant Free Resource Conhguration",3GPP TSG-RAN WG1 Meeting #88bis,Spokane, USA Apr. 3-7, 2017,total 4 pages.

LEnovo, "Discussion on retransmission design for grant-free based UL transmission", 3GPP TSG RAN WG1 Meeting #86bis, R1-1609400, Oct. 10-14, 2016, 4 Pages, Lisbon, Potugal.

Ericsson, Uplink HARQ-ACK feedback for MTC, 3GPP TSG-RAN WG1 Meeting #88bis, R1-1705193, Apr. 3-7, 2017, 4 Pages, Spokane, US.

* cited by examiner

412

| Index for 3-tuple | {P1} Initial Tx | {P2} 1st Re-Tx | {P3} 2nd Re-Tx |
|---|---|---|---|
| 1 | p11 | p21 | p31 |
| 2 | p12 | p21 | p31 |
| 3 | p13 | p22 | p32 |
| 4 | p14 | p22 | p32 |
| 5 | p15 | p21 | p32 |

414

| Index for 3-tuple | {P1} Initial Tx | {P2} 1st Re-Tx | {P3} 2nd Re-Tx |
|---|---|---|---|
| 1 | p11 | p21 | p21 |
| 2 | p12 | p21 | p21 |
| 3 | p13 | p22 | p22 |
| 4 | p14 | p22 | p22 |
| 5 | p15 | p23 | p23 |
| 6 | p16 | p23 | p23 |

FIG. 10

| Bit value | Indication |
|---|---|
| 00 | Deactivate |
| 01 | Activate and use default resource configuration |
| 10 | Activate and use secondary resource configuration |
| 11 | Activate and use tertiary resource configuration |

← 722

| Bit value | Indication |
|---|---|
| 00 | Use first resource configuration |
| 01 | Use second resource configuration |
| 10 | Use third resource configuration |
| 11 | Use fourth resource configuration |

SYSTEMS AND METHODS FOR DOWNLINK CONTROL CHANNEL SIGNALING FOR UPLINK TRANSMISSION

PRIORITY

The present application claims priority to U.S. Provisional Patent Application Ser. No. 62/492,685, entitled "Systems and Methods for Downlink Control Channel Signaling for Uplink Transmission", which was filed on May 1, 2017, and which is incorporated herein by reference.

FIELD

The present application relates generally to wireless communications, and more particularly to signaling in a downlink control channel for uplink transmission.

BACKGROUND

In some wireless communication systems, a user equipment (UE) wirelessly communicates with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a UE may wirelessly transmit data, such as a transport block (TB), to a base station in an uplink transmission at a particular frequency and during a particular interval of time. The frequency and time interval used are examples of resources. Other examples of resources may include parameters such as the reference signal used in the transmission and/or the modulation and coding scheme (MCS) used.

Some wireless communication systems may support grant-based uplink transmissions. That is, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency-division multiple access (OFDMA) frame.

Some wireless communication systems may also or instead support grant-free uplink transmissions. That is, a UE may send uplink transmissions using certain uplink resources possibly shared with other UEs, without specifically requesting use of the resources. A grant-free uplink transmission does not need a dynamic and explicit scheduling grant from the base station.

SUMMARY

A UE may be configured to use particular resources to send one or more uplink transmissions. However, sometimes during operation the particular resources the UE is configured to use are not well suited to the channel conditions at that time or result in interference or collision with other uplink transmissions.

Systems and method are disclosed in which downlink control information (DCI) in a downlink control channel may be used to update/reconfigure one or more resources used by the UE for an uplink transmission. In some embodiments, a resource reconfiguration update is sent by the base station along with hybrid automatic repeat request (HARQ) feedback. For example, a plurality of bits may be used to both indicate an acknowledgement (ACK) or a negative acknowledgement (NACK), as well as to reconfigure one or more resources for a subsequent uplink transmission.

In some embodiments, a unified downlink signaling format is disclosed that may be used for UEs having different capabilities, with the bits of the unified downlink signaling relaying different instructions to different UEs depending upon the capability of the UE.

By using DCI to reconfigure one or more resources used by a UE, the base station may change the resources used by the UE for one or more uplink transmissions to try to reduce interference, and/or to try to avoid collision, and/or to try to avoid poor channel conditions.

In one embodiment, a method is performed by a base station that may include receiving a first uplink transmission of a TB from a UE. The method may further include transmitting a message to the UE in DCI. The message may include a plurality of bits indicating HARQ feedback corresponding to the TB and indicating a change in resources to be used by the UE for a second uplink transmission. In this way, if during operation the particular resources the UE is configured to use are not well suited to the channel conditions at that time or result in interference or collision with other uplink transmissions, then the message having the HARQ feedback may also change the resources to be used by the UE. A base station to perform the method is also provided in some embodiments.

In another embodiment, a method is performed by a UE that may include sending a first uplink transmission of a TB to a base station. The method may further include receiving a message in DCI. The message may include a plurality of bits indicating HARQ feedback corresponding to the TB and indicating a change in resources to be used by the UE for a second uplink transmission. In this way, if during operation the particular resources the UE is configured to use are not well suited to the channel conditions at that time or result in interference or collision with other uplink transmissions, then the message having the HARQ feedback may also change the resources to be used by the UE. A UE to perform the method is also provided in some embodiments.

BRIEF DESCRIPTION OF THE DRAWINGS

Embodiments will be described, by way of example only, with reference to the accompanying figures wherein:

FIG. 10 illustrates tuples of reference signals that may be used for initial and retransmissions;

FIG. 25 illustrates example mappings between bits in DCI and what the bits indicate;

DETAILED DESCRIPTION

For illustrative purposes, specific example embodiments will now be explained in greater detail below in conjunction with the figures.

Figure 1:
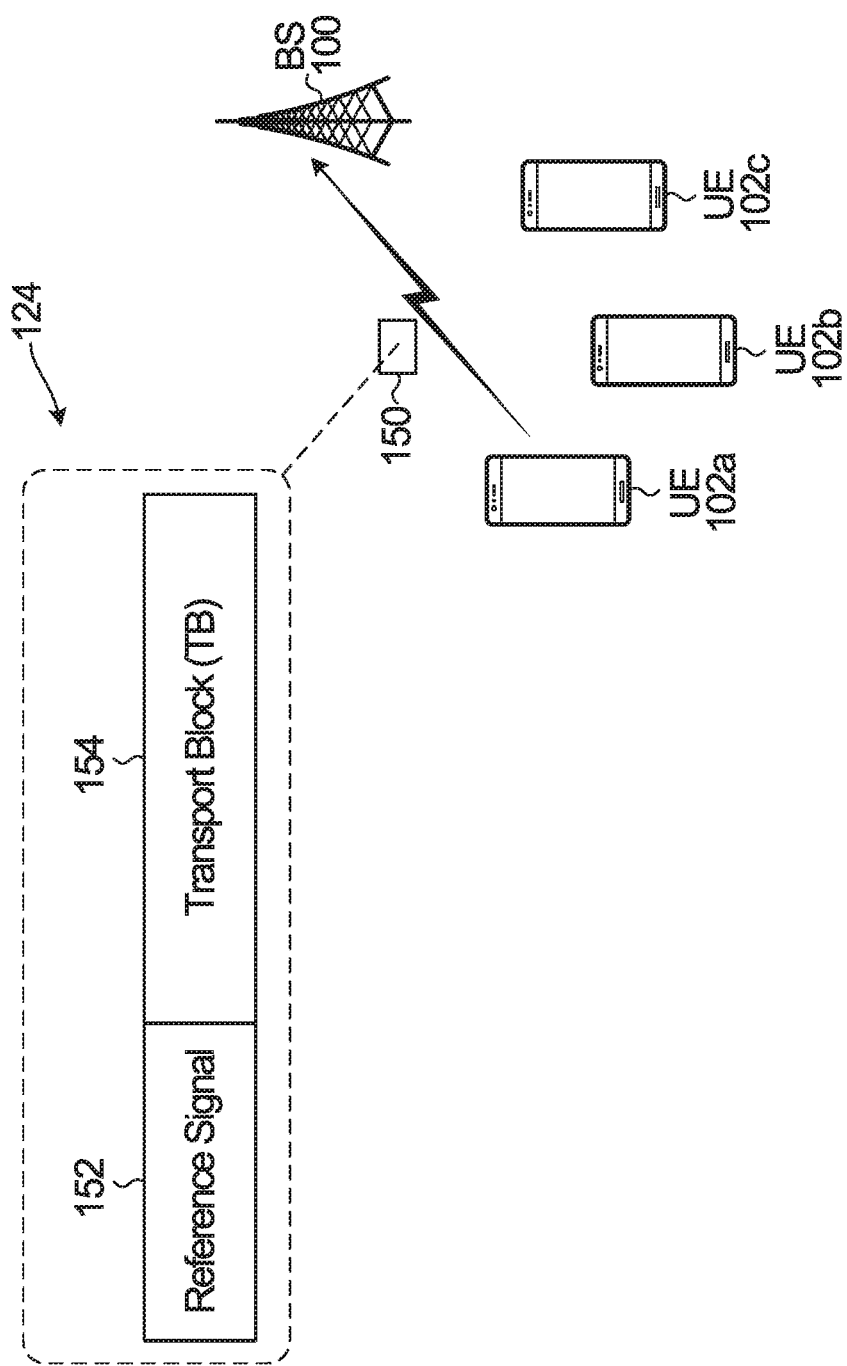
FIG. 1 is a block diagram of a base station and a plurality of UEs, according to one embodiment.

FIG. 1 is a block diagram of a base station 100 and a plurality of UEs 102a-c, according to one embodiment.

The word "base station" encompasses any device that wirelessly communicates with UEs using uplink and downlink communications. Therefore, in some implementations, the base station 100 may be called other names, such as a transmit and receive point (TRP), a base transceiver station, a radio base station, a network node, a transmit/receive node, a Node B, an eNodeB (eNB), a gNB (sometimes called a "gigabit" Node B), a relay station, or a remote radio head. Also, in some embodiments, the parts of the base station 100 may be distributed. For example, some of the modules of the base station 100 may be located remote from the equipment housing the antennas of the base station 100, and may be coupled to the equipment housing the antennas over a communication link (not shown). Therefore, in some embodiments, the term base station 100 may also refer to modules on the network side that perform processing operations, such as scheduling and downlink control signal generation, and that are not necessarily part of the equipment housing the antennas of the base station 100. The modules may also be coupled to other base stations. In some embodiments, the base station 100 may actually be a plurality of base stations that are operating together to serve the UEs 102a-c, e.g. through coordinated multipoint transmissions.

During operation. UEs 102a-c may each send uplink transmissions to the base station 100. In some embodiments the uplink transmissions are grant-based, and in other embodiments the uplink transmissions are grant-free.

An example uplink message 150 sent by UE 102a is shown in stippled bubble 124. The message 150 includes a reference signal (RS) 152. e.g. a reference signal sequence, which is used by the base station 100 for uplink channel estimation. The reference signal may be a demodulation reference signal (DMRS). The message 150 further includes a transport block (TB) 154 of data to be transmitted to the base station 100. Message 150 is only an example, and may include other components not shown. e.g. a cyclic redundancy check (CRC). Also, more generally reference signal 152 may be replaced with a multiple access (MA) signature. Therefore, for example, when reference signal is mentioned in embodiments below, an MA signature may be used instead. An MA signature may include (but is not limited to) at least one of the following: a codebook/codeword, a sequence, an interleaver and/or mapping pattern, a pilot, a demodulation reference signal (e.g. a reference signal for channel estimation), a preamble, a spatial-dimension, and a power-dimension.

During operation, downlink transmissions may also be sent from the base station to one or more of the UEs 102a-c. The downlink transmissions may include traffic in a data channel, and/or higher layer signaling (e.g. radio resource control (RRC) information sent in a downlink data channel), and/or downlink control information (DCI). Examples of DCI are described in detail herein.

Figure 2:
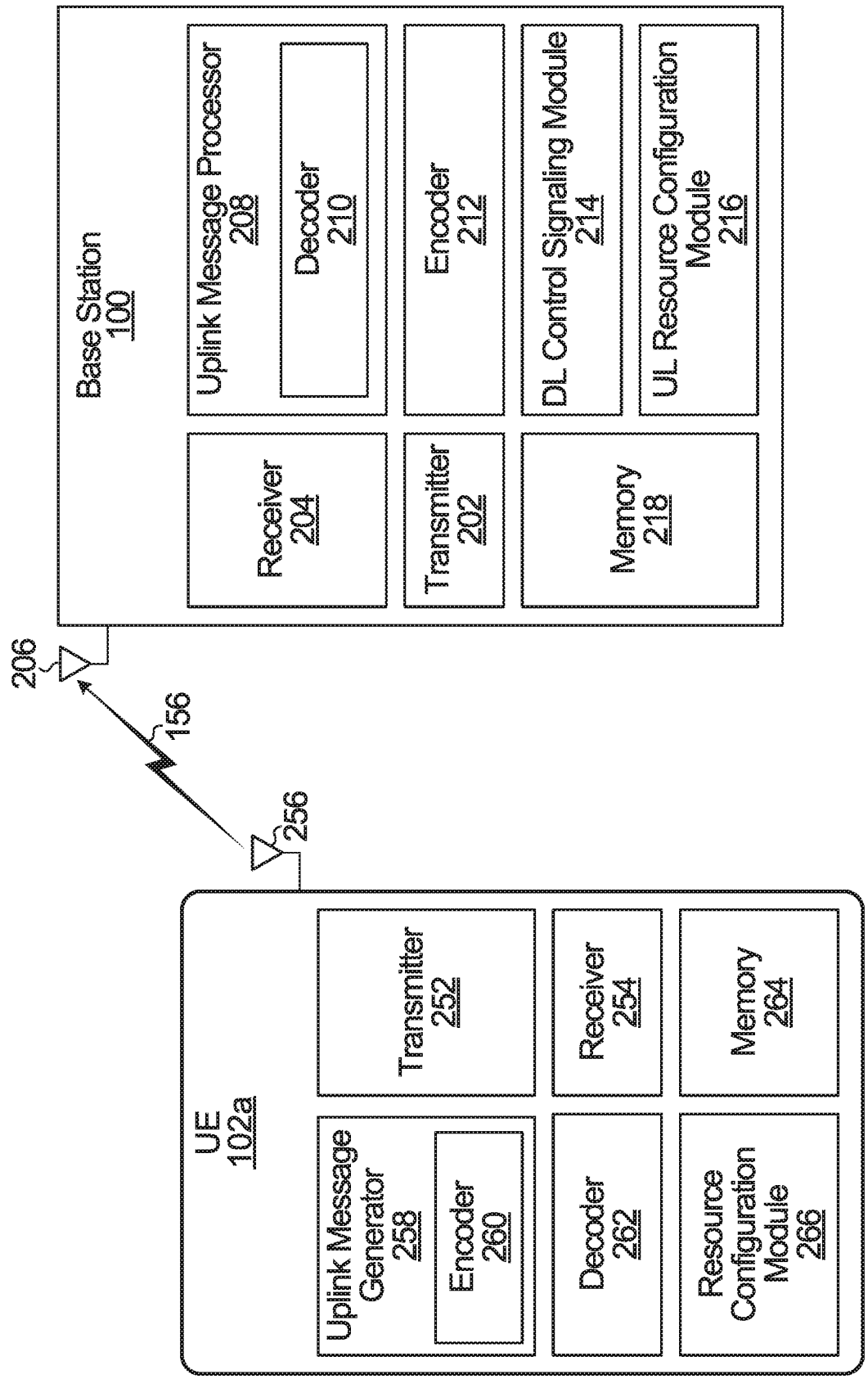
FIG. 2 is a block diagram showing a base station and UE in more detail, according to one embodiment.

FIG. 2 is a block diagram showing the base station 100 and UE 102a of FIG. 1 in more detail. The base station 100 includes a transmitter 202 and a receiver 204 coupled to one or more antennas 206. Only one antenna 206 is illustrated. The transmitter 202 and the receiver 204 may be integrated as a transceiver. The base station 100 further includes an uplink message processor 208, including a decoder 210. The uplink message processor 208 and decoder 210 perform operations relating to processing the received uplink message, such as activity detection, decoding of the TB, and the base station HARQ operations, e.g. HARQ combining and/or determining whether an acknowledgements (ACK) or a negative acknowledgement (NACK) is to be transmitted. The uplink message processor 208 may be part of the receiver 204.

The base station 100 further includes an uplink resource configuration module 216 for allocating and configuring resources for uplink transmissions. For example, the uplink resource configuration module 216 may semi-statically determine resource configurations for UEs, such as the default and secondary resource configurations described later. Each UE may receive at least one resource configuration by higher layer signaling (e.g. RRC signaling) or semi-static signaling. The uplink resource configuration module 216 may also determine when a resource reconfiguration is to be performed. e.g. based on the channel conditions or based on an anticipated reference signal collision or interference between the uplink transmissions of different UEs. The uplink resource configuration module 216 determines the resource reconfiguration that is instructed in downlink control signaling.

The base station 100 further includes a downlink control signaling module 214 for preparing the DCI information described herein, e.g. for setting and/or assembling the one or more bits used for the DCI feedback described later (e.g. resource configuration/reconfiguration and/or HARQ feedback and/or activation/deactivation). The downlink control signaling module 214 generates the DCI that is transmitted via a downlink control channel, e.g. the UE-specific DCI, the group common DCI, and/or the DCI for a dedicated downlink acknowledgement channel. The downlink control signaling module 214 may be part of the uplink resource configuration module 216 or vice versa.

The base station 100 further includes an encoder 212 for encoding messages to be sent to the UE 102a, e.g. encoding traffic in a downlink data channel and/or encoding DCI. The downlink control signaling module 214 may be part of or within the encoder 212 in some embodiments.

The base station 100 further includes a memory 218 for storing information and data.

The uplink message processor 208, the decoder 210, the encoder 212, the downlink control signaling module 214, the uplink resource configuration module 216, and/or any signal processing components of the transmitter 202 and receiver 204, may be implemented in the form of circuitry configured to perform the functions of the uplink message processor 208, the decoder 210, the encoder 212, the downlink control signaling module 214, the uplink resource configuration module 216, and/or the transmitter 202 and receiver 204. In some implementations the circuitry includes a memory and one or more processors that execute instructions that cause the one or more processors to perform the operations of the uplink message processor 208, the decoder 210, the encoder 212, the downlink control signaling module 214, the uplink resource configuration module 216, and/or the transmitter 202 and receiver 204 Alternatively, the uplink message processor 208, the decoder 210, the encoder 212, the downlink control signaling module 214, the uplink resource configuration module 216, and/or any signal processing components of the transmitter 202 and receiver 204, may be implemented using dedicated integrated circuitry, such as an application specific integrated circuit (ASIC), a graphics processing unit (GPU), or a programmed field programmable gate array (FPGA) for performing the operations of the uplink message processor 208, the decoder 210, the encoder 212, the downlink control signaling module 214, the uplink resource configuration module 216, and/or the transmitter 202 and receiver 204. In yet other implementations, the functionality of the base station 100 described herein may be fully or partially implemented in software or modules stored in the memory 218 and executed by the one or more processors.

The UE 102a also includes a transmitter 252 and a receiver 254 coupled to one or more antennas 256. Only one antenna 256 is illustrated. The transmitter 252 and the receiver 254 may be integrated as a transceiver. The UE 102a further includes an uplink message generator 258 for generating messages to be transmitted in uplink transmissions. Generating an uplink message may include encoding data to be transmitted in the message in an encoder 260, and modulating the encoded data. The UE 102a further includes a decoder 262 for decoding downlink messages sent from the base station 100. For example, the decoder 262 decodes DCI from the base station. The nature of the decoding depends upon the format of the DCI, e.g. whether it is UE specific, group common DCI, or within a dedicated downlink acknowledgement channel. The base station 100 further includes a resource configuration module 266 for determining which resources to use for an uplink transmission based instructions in DCI or based on a default resource configuration. The base station 100 further includes a memory 264 for storing information and data, such as the default and secondary resource configurations described later.

The uplink message generator 258, the encoder 260, the decoder 262, the resource configuration module 266 and/or any signal processing components of the transmitter 252 and receiver 254, may be implemented in the form of circuitry configured to perform the functions of the uplink message generator 258, the encoder 260, the decoder 262, the resource configuration module 266, and/or the transmitter 252 and receiver 254. In some implementations the circuitry includes a memory and one or more processors that execute instructions that cause the one or more processors to perform the operations of the uplink message generator 258, the encoder 260, the decoder 262, the resource configuration module 266, and/or the transmitter 252 and receiver 254. Alternatively, the uplink message generator 258, the encoder 260, the decoder 262, the resource configuration module 266, and/or the transmitter 252 and receiver 254, may be implemented using dedicated integrated circuitry, such as an ASIC, a GPU, or an FPGA for performing the operations of the uplink message generator 258, the encoder 260, the decoder 262, the resource configuration module 266, and/or the transmitter 252 and receiver 254. In yet other implementations, the functionality of the UE 102a described herein may be fully or partially implemented in software or modules stored in the memory 218 and executed by the one or more processors.

The base station 100 and the UE 102a may include other components, but these have been omitted for the sake of clarity. Also, the UEs 102b and 102c are not shown in detail in the figures, but UEs 102b and 102c have the same components as UE 102a illustrated in FIG. 2.

HARQ for Uplink Transmissions

HARQ may be performed for the uplink transmissions. For example, if the TB 154 in an initial uplink transmission is not successfully decoded by the base station 100, then a retransmission may be performed by the UE. The word "transmission" as used herein, may refer to an initial transmission or a retransmission. A retransmission may include a copy of the previously transmitted TB and/or further information for decoding the TB. For example, the retransmission data may include some or all of the original data and/or parity information. The base station 100 may perform HARQ combining as follows: instead of discarding unsuccessfully decoded initial data, the unsuccessfully decoded initial data may be stored at the base station 100 in memory and combined with received retransmission data to try to successfully decode the TB. When HARQ combining is performed, the retransmission data from the UE may not need to be a complete retransmission of the initial data. The retransmission may carry less data, such as some or all of the parity bits associated with the initial data. One type of HARQ combining that may be used is soft combining, such as chase combining or incremental redundancy.

Initial transmissions and retransmissions may use different redundancy versions (RVs). Different RVs may also be referred to as different revisions. When data is encoded in the message generator 258, the encoded bits may be partitioned into different sets that possibly overlap with each other. Each set is a different RV. For example, some RVs may have more parity bits than other RVs. Each RV is identified by an RV index (e.g. RV 0, RV 1, RV 2 . . . etc.). When an uplink transmission is sent using a particular RV, then only the encoded bits corresponding to that RV are transmitted. Different channel codes may be used to generate the encoded bits, e.g. turbo codes, low-density parity-check (LDPC) codes, polar codes, etc. An error control coder (not illustrated) in the message generator 258 in the UE 102a may perform the channel coding. In one embodiment, the channel coding results in an encoded bit stream comprising three bit streams: a systematic bit stream and two parity bit streams. Rate matching may be performed, and a circular buffer (not illustrated) may store the systematic and parity bits. The bits may be read from the circular buffer and modulated for transmission in the uplink message. The circular buffer has different RVs associated with it, e.g. four redundancy versions (RVs): RV0, RV1, RV2, and RV3. Each RV indicates a starting location from which the coded bits are to be read from the circular buffer. Therefore, each RV transmits a different set of the encoded bits. Data may initially be transmitted using RV 0, but a retransmission may sometimes use a higher RV, e.g., RV 2 for the first retransmission, RV 3 for a second retransmission, etc.

The base station 100 uses knowledge of the RV to perform decoding. For chase combining, the RV of the initial and retransmissions may be the same, e.g. RV 0. For incremental redundancy, the retransmissions may use a higher RV that may follow a predetermined pattern, e.g. RV 0 for the initial transmission. RV 2 for the first retransmission, RV 3 for the second retransmission, and RV 1 for the third retransmission. Therefore, in order to decode the data, it may be necessary for the base station 100 to know the RV index of the data being received in a grant-free uplink transmission, unless there is only one predefined RV.

As part of the HARQ procedure for an uplink transmission, an ACK may be sent by the base station 100 when the base station 100 successfully decodes the TB. In some embodiments, a NACK may be sent by the base station 100 when the TB is not successfully decoded.

In some embodiments, autonomous grant-free retransmissions may be performed by a UE, which means that the UE automatically sends one or more retransmissions of a TB without waiting a set period of time for an ACK or a NACK for a previous transmission of the TB. An autonomous grant-free re-transmission is sometimes referred to as a repetition. When autonomous grant-free retransmissions of a TB are sent by a UE, NACKs are typically not sent by the base station for the TB. In some embodiments, the UE terminates the autonomous retransmissions when an ACK is received from the base station for the TB, or when the maximum number of retransmissions has occurred. In some embodiments. HARQ feedback is only generated by the base station after the initial transmission and one or more repetitions. HARQ feedback may or may not be based on repetition(s)+initial transmission, and may be based on the initial transmissions only.

A UE may transmit multiple TBs and therefore there may be multiple HARQ processes ongoing at any one time for a UE. The different HARQ processes may be identified using different HARQ process IDs. For example, when a UE sends an initial transmission of a first TB and any retransmissions of that first TB, then the UE may associate such initial transmissions/retransmissions with an HARQ process ID #1. When the UE sends an initial transmission of another TB and any retransmissions of that other TB, then the UE may associate such initial transmissions/retransmissions with an HARQ process ID #2. Multiple HARQ processes may be ongoing in parallel.

Figure 3:
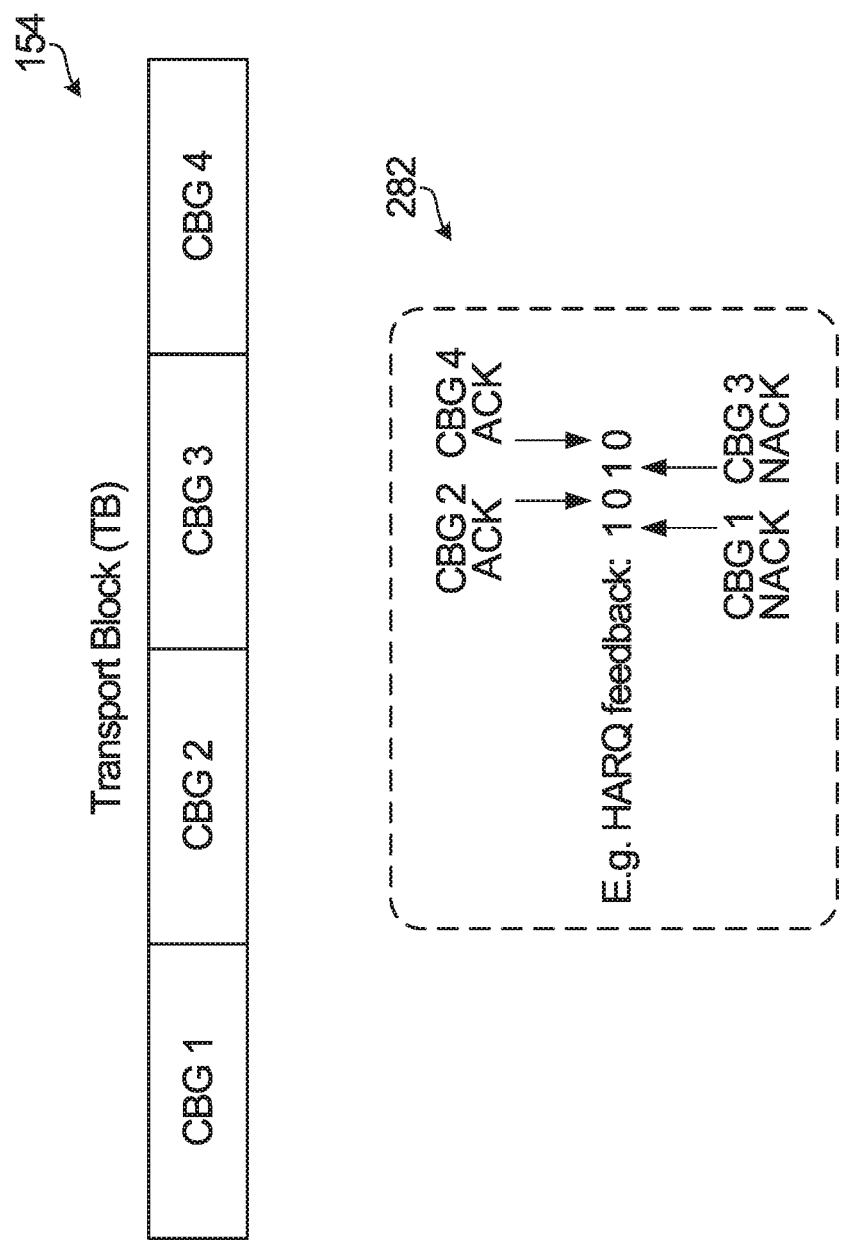
FIG. 3 illustrates a transport block (TB) partitioned into four code block groups (CBGs), according to one embodiment.

In some embodiments, a TB may comprise multiple code block groups (CBGs). If the TB comprises multiple CBGs, then the base station does not need to attempt to decode the TB as a whole, but can instead separately decode each CBG. For example, FIG. 3 illustrates TB 154 partitioned into four CBGs: CBG 1, CBG 2, CBG 3, and CBG 4. The base station 100 can attempt to separately decode each CBG, rather than decode TB 154 as a whole. In some embodiments, HARQ feedback may be provided on a CBG basis. As example, if base station 100 only successfully decoded CBG 2 and CBG 4, then base station 100 may send 4 bit HARQ feedback: the first and third bits representing NACK and respectively corresponding to CBGs 1 and 3; and the second and forth bits representing ACK and respectively corresponding to CBGs 2 and 4. An example bit mapping is shown in stippled bubble 282.

Initial transmissions and retransmissions may or may not have the same CBG configuration. In one example, the number of CBGs for uplink transmission, either grant-free or grant-based, is configured and the number of CBs in a CBG changes according to the packet size. In that case, the number of bits for CBG-based HARQ feedback could be fixed, regardless of packet size. In another example, the number of CBs within a CBG is configured and number of CBGs changes according to packet size. In that case, the number of bits in HARQ feedback can be variable depending on number of CBGs. In another example, both the number of CBs and CBGs are defined according packet size, for example, based on some rule or table.

Uplink Time-Frequency Resources

Figure 4:
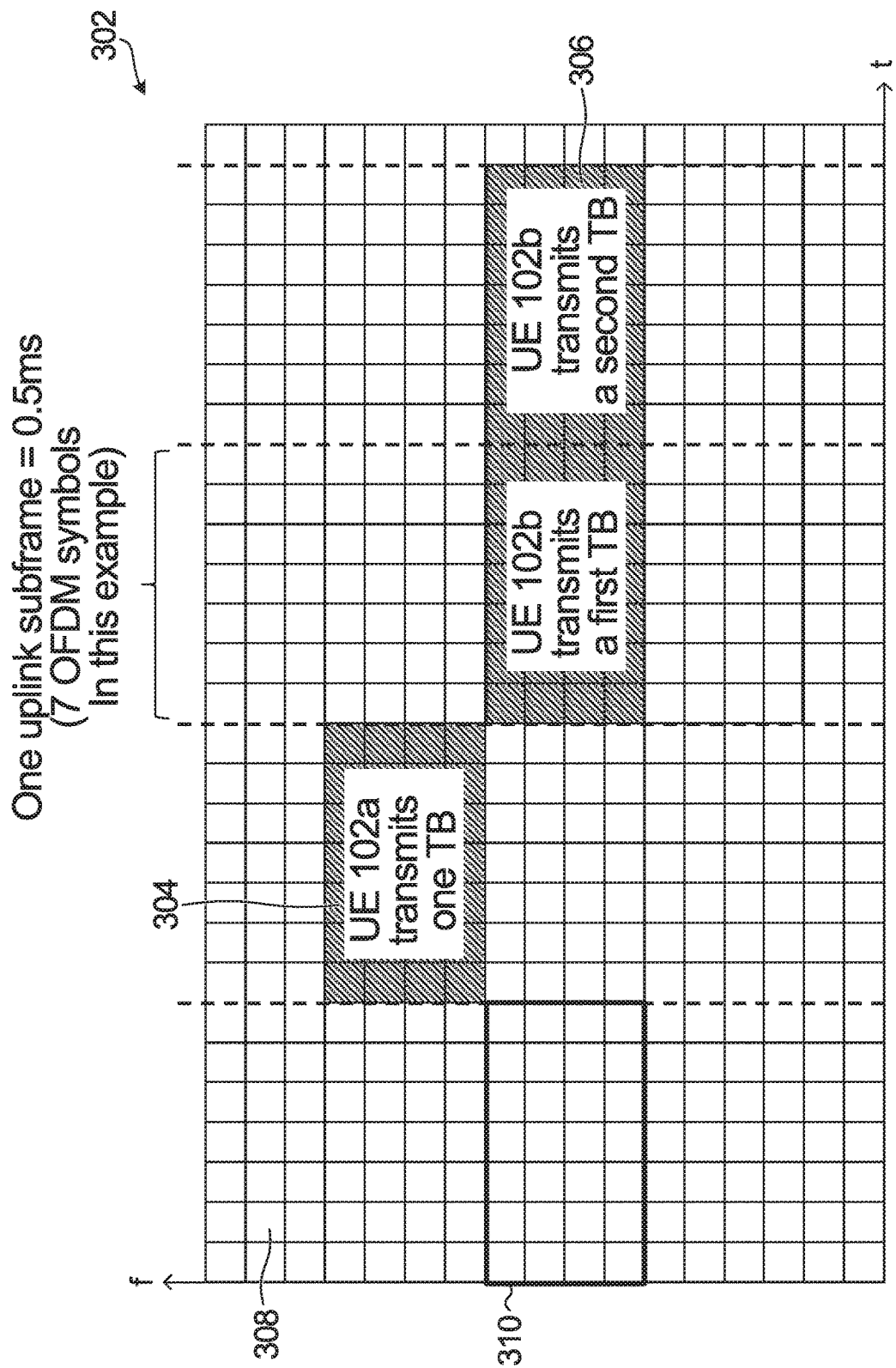
FIG. 4 is an example of uplink time-frequency resources, according to one embodiment.

Transmissions between the base station 100 and the UEs 102a-c are performed using resources. FIG. 4 is an example of uplink time-frequency resources 302, according to one embodiment. The time-frequency resources 302 may be part of an uplink data channel, e.g. a physical uplink shared channel (PUSCH). In another embodiment. 302 may be overlapped with time-frequency resources configured for a physical uplink control channel (PUCCH) or transmission of scheduling request or other uplink control information.

The time-frequency resources 302 are partitioned into subframes, which are separated by stippled lines. A subframe has a duration of 0.5 ms. In the example time-frequency resources of FIG. 4, each subframe comprises 7 OFDM symbols. However, this is only an example. In some embodiments, there may be more or fewer OFDM symbols in a subframe, and the number of OFDM symbols in a subframe may depend upon the subcarrier spacing. The time-frequency resources 302 include a plurality of resource elements (REs). Each RE is 1 subcarrier by 1 symbol, and an example of an RE is shown at 308. In FIG. 4, a resource block (RB) is the smallest unit of resources that can be allocated for an uplink transmission of a UE. An example of a resource block (RB) is shown at 310. RB 310 happens to be one subfame in time by four subcarriers in frequency, but this is only an example. For example, in LTE, an RB may span 12 subcarriers and may have a duration in time equal to 1 ms. Also, the RB 310 may be distributed over time-frequency in actual implementation, i.e. the 28 REs of the RB 310 may not necessarily be adjacent to each other. Each RB may be associated with an index, which identifies the time-frequency location of the RB. For example, RB 310 may be RB index "14".

A transmission time interval (TTI) is the interval of time over which a TB is transmitted from a UE. A TTI is sometimes instead called a transmission time unit (TTU). Different UEs may have TTIs of different lengths. However, in the specific embodiment described in relation to FIG. 4, the TTI is the same for each UE. Also, in the specific embodiment described in relation to FIG. 4, a TTI happens to be equal to a subframe duration (0.5 ms), and a TB is transmitted over one RB. However, in general this need not be the case.

In one example, a TTI can be formed in terms of slot(s) or mini-slot(s) or a combination of slot(s) and mini-slot(s). A mini-slot has fewer OFDM symbols than a slot. For example, if slot has 7 OFDM symbols, a mini-slot can be from 1 to 6 OFDM symbols. In another example, a TTI may or may not be a collection of continuous symbols. Some OFDM symbols in a TTI may be reserved and not used for uplink data transmission, either grant-free or grant-based. The monitoring period/interval of downlink control signaling mentioned below may be shorter or longer than a TTI or a duration of one transmission. For example, a UE may monitor control signaling every OFDM symbol, whereas a TTI duration is 7 OFDM symbols. It may also be possible that a grant-free or grant-based transmission receive control signaling during ongoing transmission and adjust for the remainder of the transmission. Examples of control signaling are mentioned below. Control signaling can provide resource configuration information or updates or even notify the UE of postponing part or all of the remaining transmission. Control signaling can be UE specific DCI, or group DCI which may have UE specific fields, hopping pattern specific fields, or a field that is common to all UEs.

At partition 304, UE 102a uses one RB, which has a duration of one subframe, to send an uplink transmission carrying one TB. At partition 306, UE 102b uses two RBs, each having a duration of one subframe, to send an uplink transmission having two TBs: a first TB and a second TB.

A subframe may have a subframe number/index corresponding to the position of the subframe in the frame. The frame the subframe is part of may also have a number, e.g. a system frame number (SFN).

Also, although not shown in FIG. 4, control information may also be sent from the UEs to the base station 100 using some of the uplink time-frequency resources 302.

Downlink Time-Frequency Resources

Figure 5:
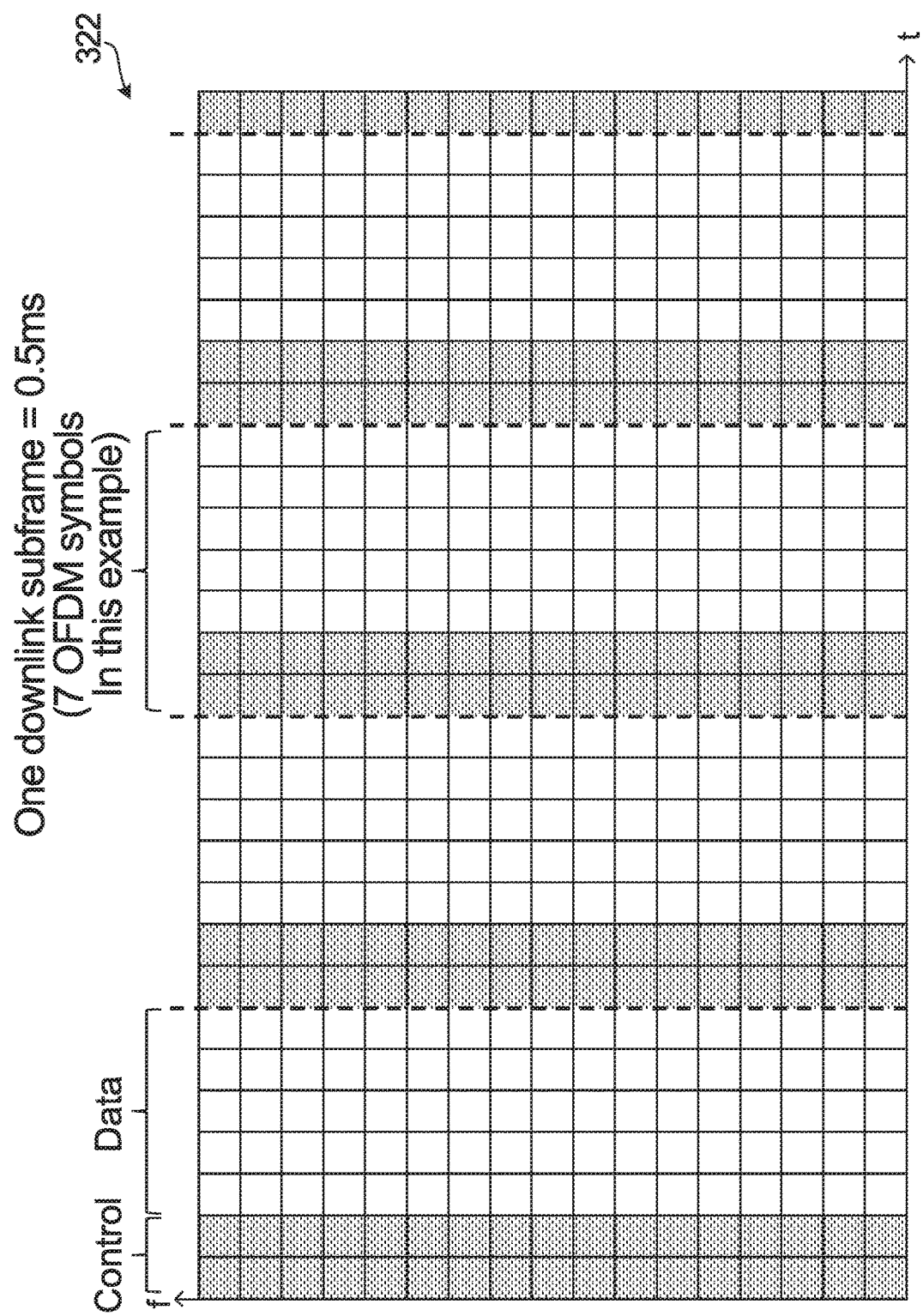
FIG. 5 is an example of downlink time-frequency resources, according to one embodiment.

FIG. 5 is an example of downlink time-frequency resources 322, according to one embodiment. In the embodiment described in relation to FIG. 5, a subframe again has a duration of 0.5 ms, and each subframe comprises 7 OFDM symbols. However, this is only an example. A partition of the downlink time-frequency resources, shown in hatching, is used for sending downlink control information (DCI) to the UEs. The DCI is sent as part of the physical layer and is therefore also sometimes called other names, such as physical layer downlink control information, physical layer control signaling, physical layer signaling, layer 1 downlink control information, layer 1 control signaling, or layer 1 signaling.

The portion of the downlink time-frequency resources not illustrated in hatching in FIG. 5 is used for sending data in one or more data channels, such as in a physical downlink shared channel (PDSCH). TBs of data are sent to the UEs in a data channel. The data may include downlink traffic to send to the UEs, but may also sometimes include higher layer control signalling, such as radio resource control (RRC) signaling.

In FIG. 5, every subframe has its first two OFDM symbols used for sending control information from the base station, and the rest of the OFDM symbols are used for sending TBs of data from the base station. This is only an example. The portion of a subframe dedicated to sending DCI may be different from that illustrated. More generally, any OFDM symbol can have a control region or control resource set(s) configured in it, not just the first few OFDM symbols in a subframe.

Different types of control information may be sent as part of the DCI. Examples of control information described later that may be sent include: HARQ feedback, and/or activation or deactivation of grant-free resources, and/or resource configuration updates. A unified downlink control signaling format is described later.

Three example methods for sending DCI are described below.

A. UE-Specific DCI:

In some embodiments, particular DCI may be UE-specific, i.e. only meant for a particular UE. For example, DCI meant for UE 102a may be encoded by the base station 100 with a CRC field. The CRC field may be masked with a UE ID that uniquely identifies UE 102a on the resources. The UE ID may be the RNTI for UE 102a (e.g. the cell RNTI (C_RNTI)), although this is not a necessity. In some embodiments, the DCI for UE 102a may be transmitted at a location in the downlink control channel within the search space defined by the UE ID (e.g. defined by the C_RNTI). UE 102a may attempt to decode all the possible locations of DCIs within its search space. If the CRC checks with the assigned UE ID of UE 102a, then the control channel is declared as valid and the UE 102a processes the control information inside the DCI.

Figure 6:
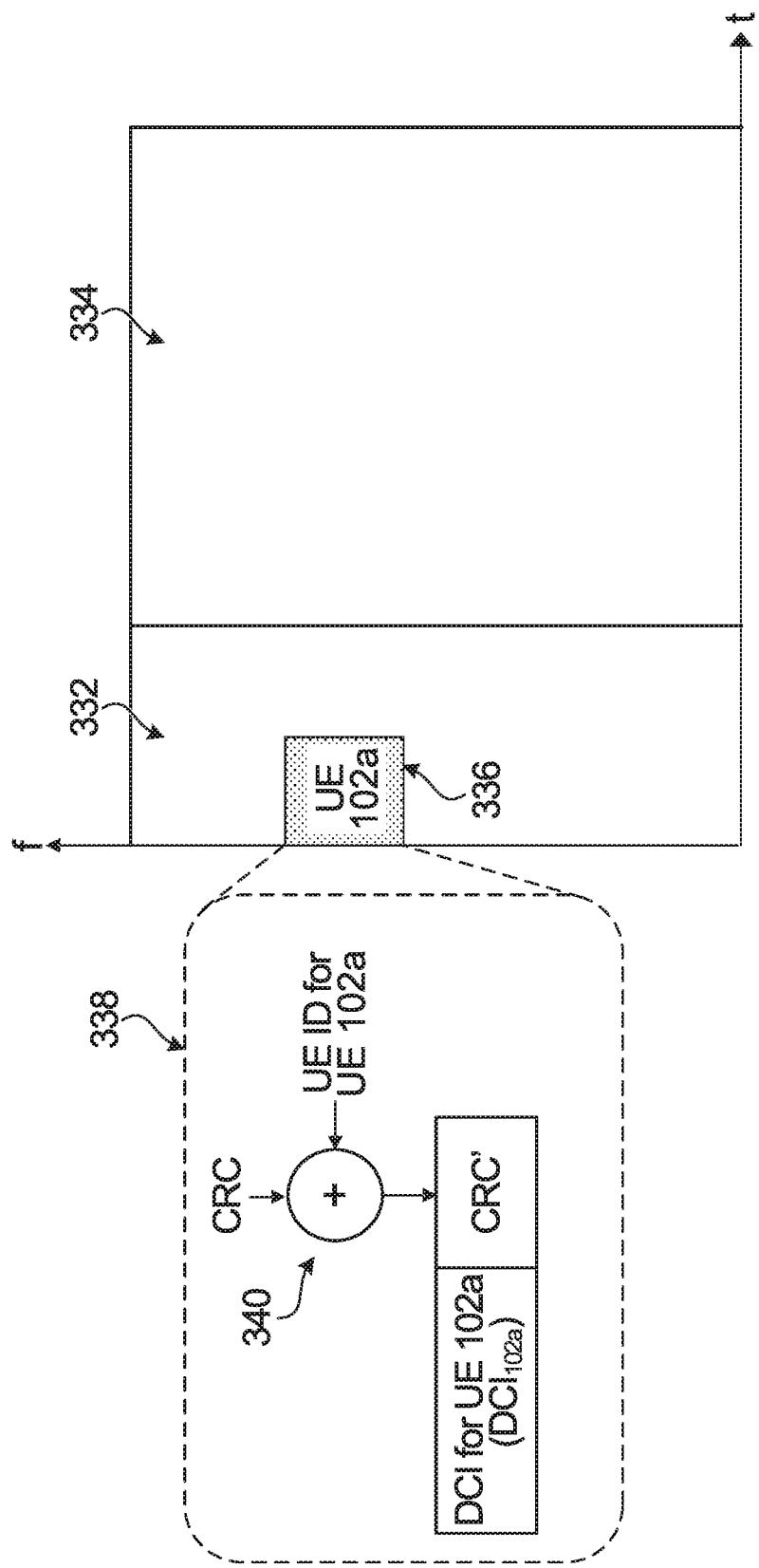
FIG. 6 illustrates an example of UE-specific downlink control information (DCI)

An example of UE-specific DCI for UE 102a is illustrated in FIG. 6. FIG. 6 illustrates a time-frequency resource allocation in which a first logical partition of time-frequency resources form a downlink control channel 332 and a second logical partition of time-frequency resources form the downlink data channel 334. OFDM symbols or subframes are not illustrated, and the partition between the downlink control channel 332 and the data channel 334 is described as a logical partition to emphasize that the specific partition of control channel and data channel shown in FIG. 5 is not necessary. The control channel 332 of FIG. 6 includes control information $DCI_{102a}$ for UE 102a at resource partition 336. At least a portion of the control information for UE 102a is masked, using the ID of the UE 102a, by the base station 100. In this example, the CRC of $DCI_{102a}$ is masked by scrambling the CRC of $DCI_{102a}$ with the ID of UE 102a, as shown in stippled bubble 338. Specifically, the masking occurs by XORing the CRC with a bitmask comprising the ID of UE 102a, as shown at 340.

During operation, the decoder of UE 102a uses its ID to unmask the CRC and obtains the control information payload, i.e., the $DCI_{102a}$. Specifically, the decoder of UE 102a performs blind decoding on the control channel 332 with unmasking using the ID of UE 102a, e.g. by unscrambling the CRC using the ID of UE 102a by performing an XOR operation between the masked CRC and the ID of UE 102a. When the unmasking using the ID of UE 102a is successful (e.g. the unscrambled CRC results in a correct CRC value match), then the $DCI_{102a}$ is obtained.

B. Group Common DCI:

In some embodiments, DCI for a group of UEs may be sent as group common DCI, e.g. a multicast control message addressing a group of UEs using a group ID, such as a group RNTI (G-RNTI). In some embodiments, the group common DCI may be sent in a control channel referred to as a group common physical downlink control channel (PDCCH).

Figure 7:
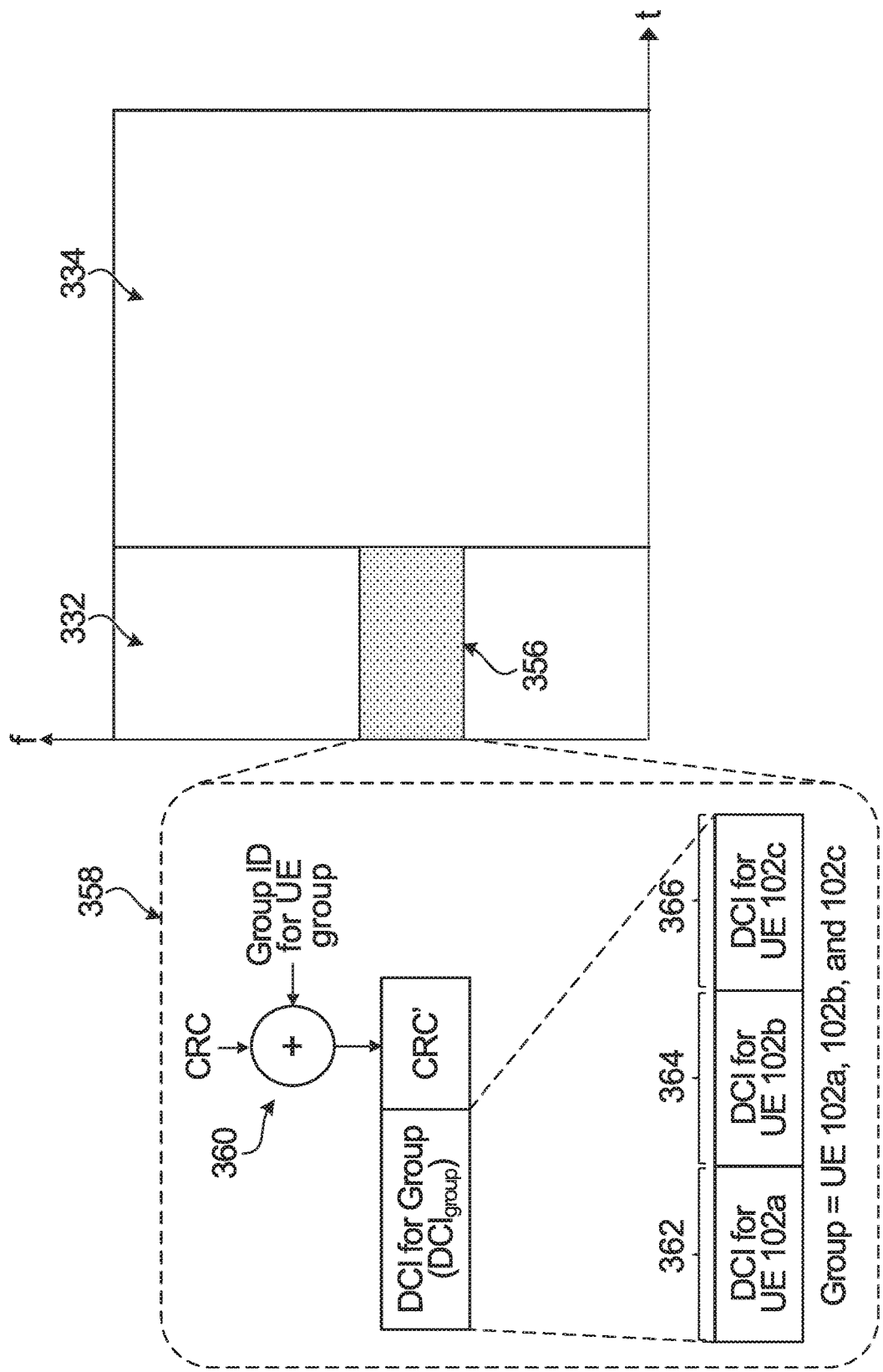
FIG. 7 illustrates an example of group common DCI.

In some embodiments, the group common DCI is a message addressing a group of M UEs using the group ID (e.g. group RNTI) and comprising fields for different UEs in the group, as well as a CRC field encoded using the group ID. For example, FIG. 7 illustrates the same time-frequency resource allocation of FIG. 6, but the control channel 332 includes control information for a group of UEs at resource partition 356. The group of UEs includes UEs 102a, 102b, and 102c. At least a portion of the control information is masked, using the group ID, by the base station 100. In this example, the CRC of $DCI_{Group}$ is masked by scrambling the CRC of $DCI_{Group}$ with the Group ID, as shown in stippled bubble 358. Specifically, the masking occurs by XORing the CRC with a bitmask comprising the Group ID, as shown at 360.

The $DCI_{Group}$ includes three fields 362, 364, and 366, each carrying a DCI message for a respective one of UEs 102a, 102b, and 102c. During operation, each one of UEs 102a-c in the group performs blind decoding on the control channel 332 with unmasking using the group ID, e.g. by unscrambling the CRC using the group ID by performing an XOR operation between the masked CRC and the group ID. When the unmasking using the group ID is successful (e.g. the unscrambled CRC results in a correct CRC value match), then the $DCI_{Group}$ is obtained. The UE then reads the field in the $DCI_{Group}$ that corresponds to the UE. For example, UE 102a reads field 362. There are different mappings between UEs and fields that are possible, and this is explained in more detail later.

Although the description above in relation to FIG. 7 describes a CRC, in some embodiments the group common DCI message need not be CRC appended. For example, if the group DCI comes in reserved resources, a CRC may not be needed. A CRC is typically used when the same resource can be used by many messages in an overlapping fashion. Also, in some embodiments, the group common DCI message may be sequence based, like in the PUCCH. When group common DCI messages are discussed herein (e.g. in relation to embodiments described later, such as in FIG. 13), the group common DCI is illustrated/described as having a CRC appended. However, the embodiments equally apply to group common DCI that do not have a CRC and/or that are sequence based.

C. Dedicated Downlink Acknowledgement Channel:

In some embodiments, HARQ feedback for a UE, possibly along with other DCI, may be sent in a dedicated downlink acknowledgement channel. e.g. such as a physical HARQ indicator channel (PHICH) or PHICH-like channel. The dedicated downlink acknowledgement channel may carry both ACK and NACK feedback.

Figure 8:
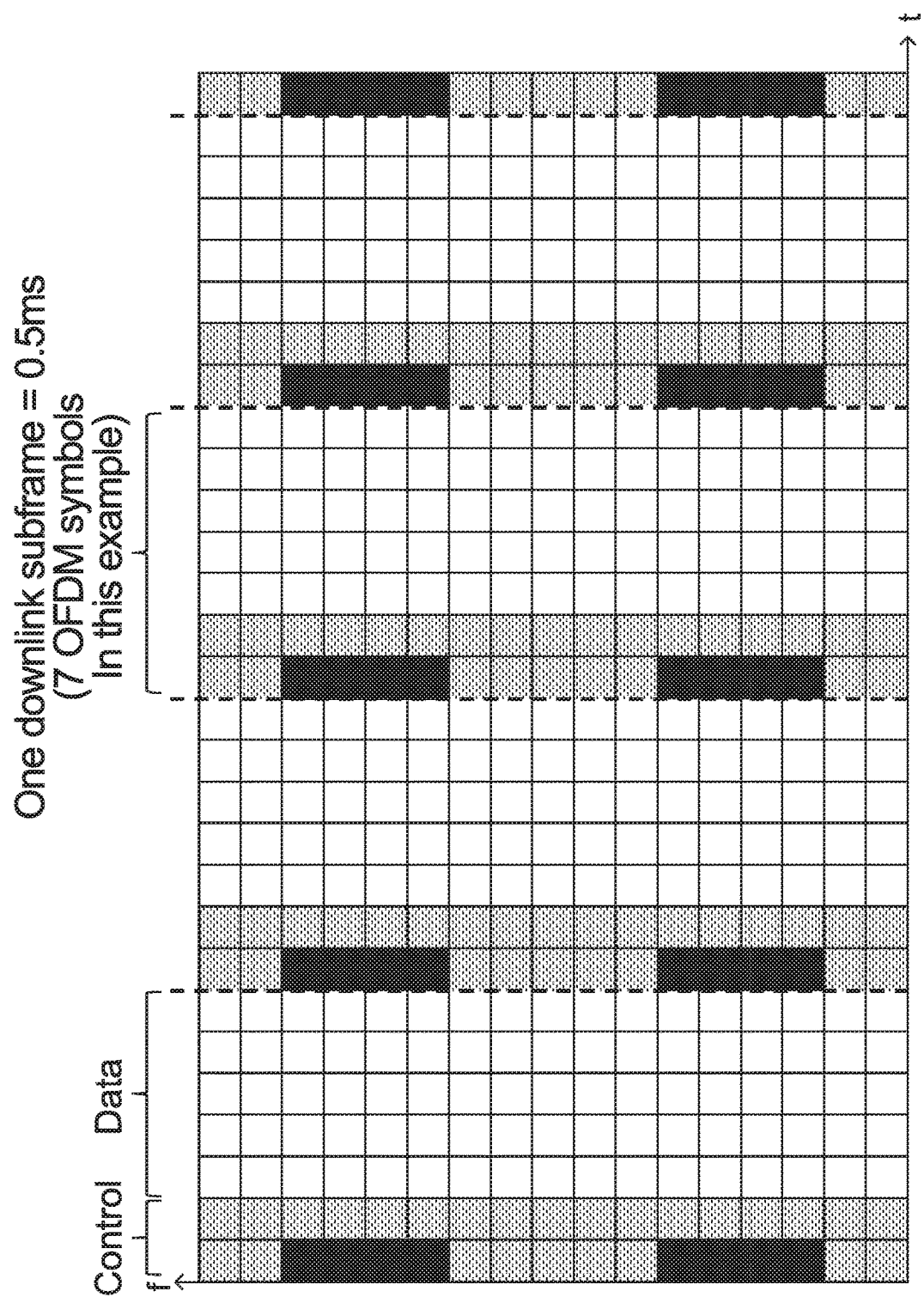
FIG. 8 illustrates a plurality of resource element groups (REGs) of a dedicated downlink acknowledgement channel, according to one embodiment.

In some embodiments, the dedicated downlink acknowledgement channel may comprise a plurality of resource element groups (REGs). As an example, FIG. 8 is the same example time-frequency resource partition as FIG. 5, but with a few example REGs in the downlink control channel shown using black boxes. Each REG comprises four REs, although this is only an example. In general, a REG may be defined as having more or fewer REs. Also, the REs in a REG do not have to be adjacent to each other.

In some embodiments, more than one REG may be needed to send the HARQ feedback for a particular uplink HARQ process. For example, in LTE, three REGs are used to carry an ACK/NACK for a particular uplink HARQ process. The same three REGs may be used to also transmit ACK/NACKs for other uplink HARQ processes for other UEs, e.g. by using orthogonal spreading sequences to distinguish between the different HARQ processes. For example, in LTE, a PHICH channel comprises multiple PHICH groups. Each PHICH group is associated with a group number identifying the location of the PHICH group in the time-frequency resources. Each PHICH group consists of 3 REGs. Each ACK/NACK is mapped to a particular PHICH group based on the frequency location of the uplink transmission being ACK/NACK'd, e.g. based on the starting RB index of the uplink transmission. The orthogonal spreading sequence used to encode and decode the ACK/NACK in that PHICH group may be based on the reference signal used when transmitting the uplink transmission being ACK/NACK'd. For example, the orthogonal spreading sequence may be mapped to the DMRS cyclic shift.

Semi-Static Resource Configuration

A UE uses resources to send uplink transmissions. Four examples of resources that can be used by a UE to send an uplink transmission are described below. Any one, some or all of these resources may be configured by a base station. Other resources not listed below may be used (e.g. codebook/codeword, transmit power, numerology, etc.), and may be configured by the base station also.

Figure 9:
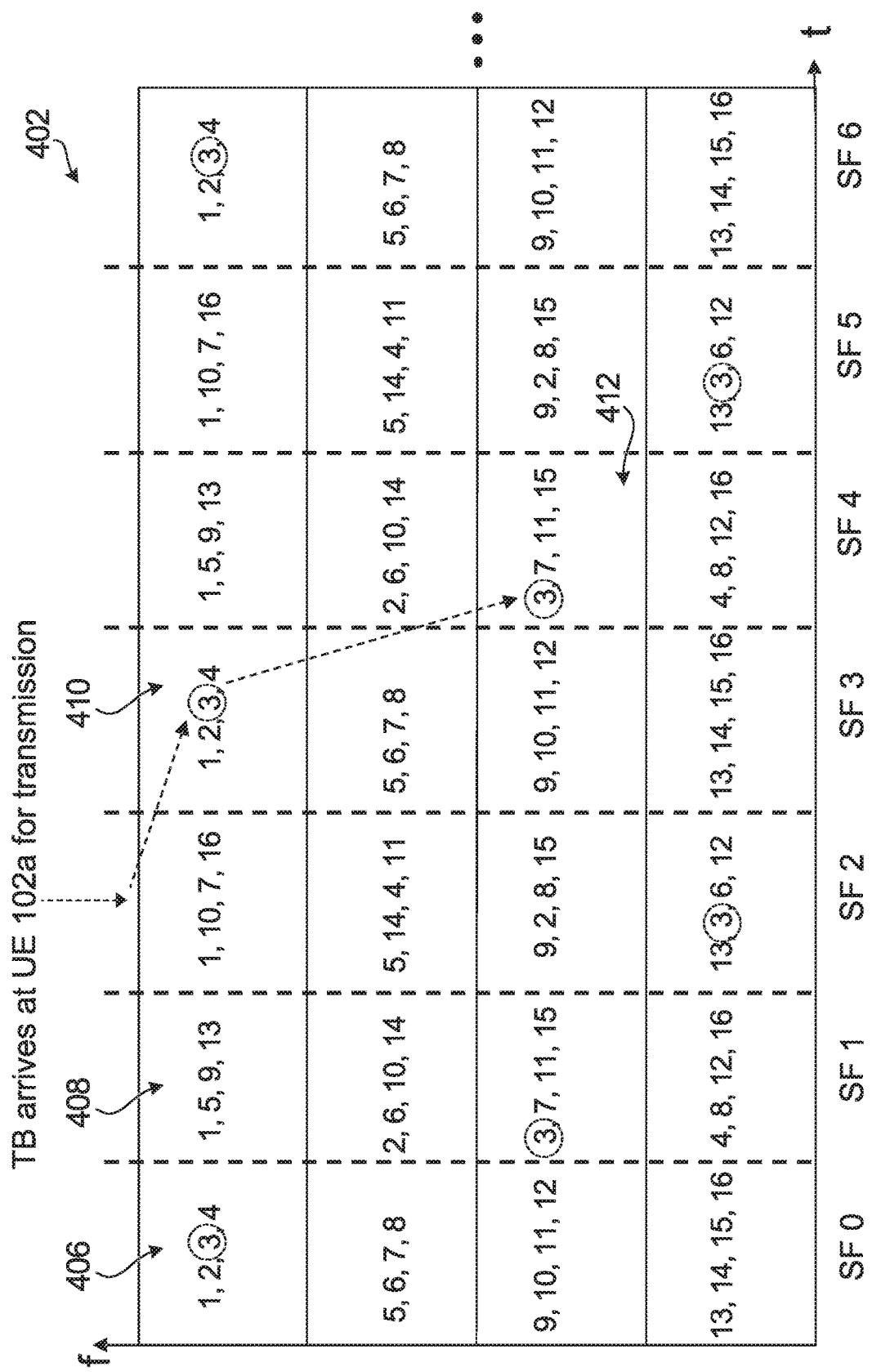
FIG. 9 illustrates a set of uplink time-frequency resources showing multiple predetermined hopping patterns, according to one embodiment.

(1) Time-frequency resources. In grant-based operation, a UE may be assigned a particular time-frequency resource to send a particular packet. In grant-free operation, a UE may assigned particular time-frequency resources, or a pattern of time-frequency resources, for example a hopping pattern which may have a periodicity, for sending any needed grant-free uplink transmissions. For example, a UE may be configured to send any grant-free uplink transmissions the UE has according to an assigned resource hopping pattern. As an example, FIG. 9 illustrates a set of uplink time-frequency resources 402 showing multiple predetermined hopping patterns, according to one embodiment. Each predetermined hopping pattern is identified by an index number. For example, hopping pattern '3' is specifically highlighted using a stippled circle. The time-frequency resources are partitioned into different resource partitions. e.g. reference character 406 identifies one resource partition. The resource partition may be a logical partition. Each resource partition may be used for simultaneous transmissions from four different hopping patterns. Higher layer or layer 1 (e.g. physical layer DCI) signalling may notify the UE of the assigned hopping patterns. For example, an uplink transmission from a UE using pattern 1, another uplink transmission from a UE using pattern 2, another uplink transmission from a UE using pattern 3, and another uplink transmission from a UE using pattern 4 may all be sent at resource partition 406. As another example, an uplink transmission from a UE using pattern 1, another uplink transmission from a UE using pattern 5, another uplink transmission from a UE using pattern 9, and another uplink transmission from a UE using pattern 13 may all be sent at resource partition 408. The order of the pattern numbers in each resource partition may be used to define a mapping to HARQ feedback (and possibly other DCI) for each UE in a downlink control channel. Examples are discussed later. Alternatively, order of numbers in each partition is for representation only and means that there can be up to four transmission in a partition, i.e., transmission of up to four hopping patterns are mapped to each partition. In some embodiments, a UE may be assigned one or multiple patterns. The patterns may be assigned by the base station on a UE basis or on a TB basis if the UE supports simultaneous uplink HARQ processes. As one example, the base station assigns hopping pattern 3 to UE 102a. Then, if during subframe k a TB arrives in the transmit buffer of UE 102a to be sent in a grant-free uplink transmission, the UE 102a sends the TB during subframe k+1 on the resource partition mapped to pattern 3. For example, if a TB arrives during subframe SF 2, as illustrated in FIG. 9, then an initial transmission of the TB occurs at resource partition 410, a first retransmission occurs at partition 412, etc.

(2) Modulation and coding scheme (MCS). A UE may be configured by the base station to use a particular MCS value. For example, the base station may assign an MCS to the UE to use with any grant-free transmissions the UE may have. In some embodiments, the MCS may follow a hopping pattern, e.g. an initial transmission uses a high MCS, the first retransmission uses a lower MCS, etc.

Figure 11:
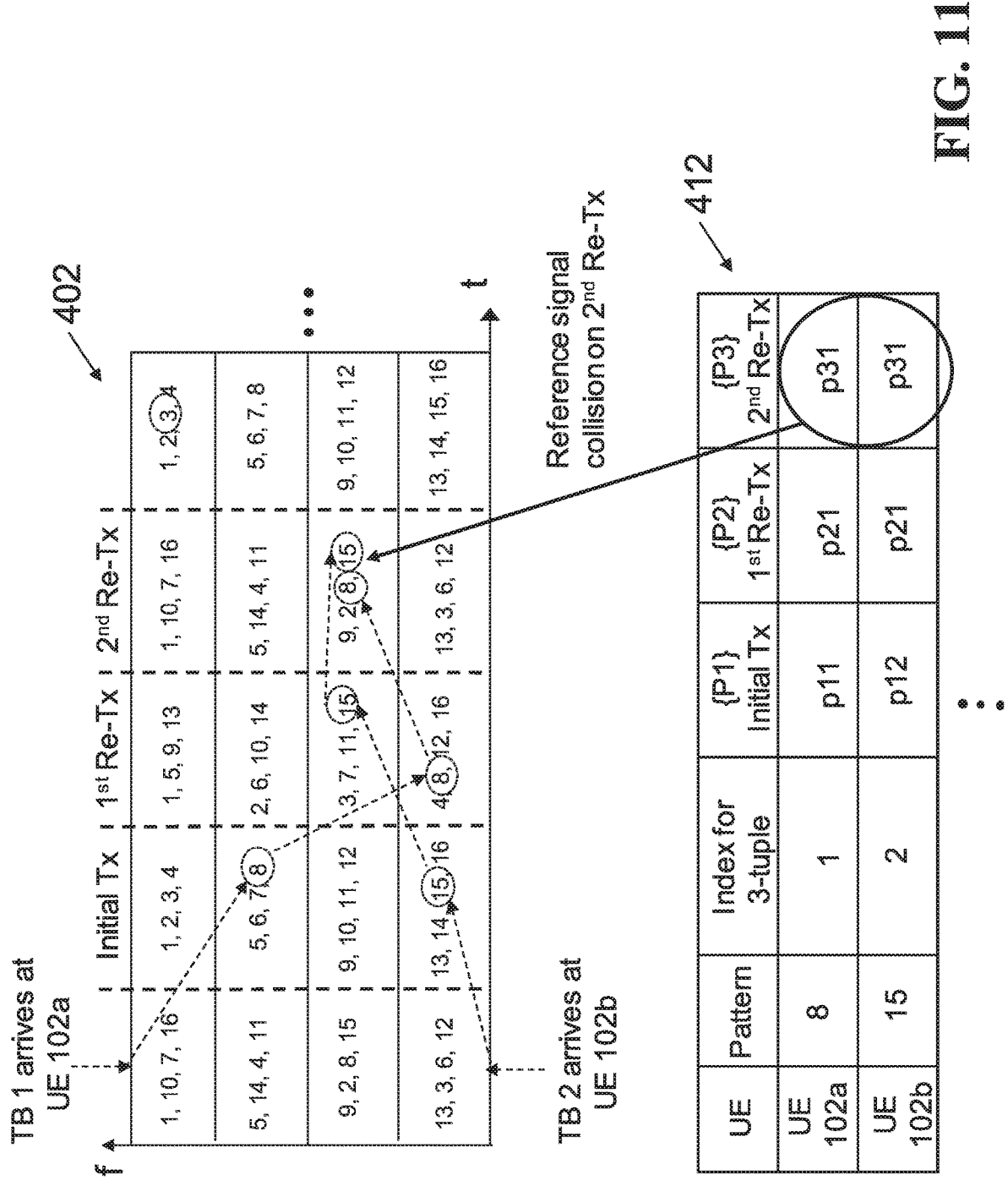
FIG. 11 illustrates an example of reference signal collision.

(3) Reference signal. A UE may be configured by the base station to use a particular reference signal or pool of reference signals for uplink transmissions. As an example, FIG. 10 illustrates two tables 412 and 414, each showing tuples of reference signals that may be used for initial and retransmissions. In table 412, a pool of nine reference signals (p11, p12, p13, p14, p15, p21, p22, p31, and p32) are separated in five different tuples. When a UE has a TB to send to the base station, the UE uses one of the 3-tuples. For example, if the UE uses 3-tuple index '1', then the UE use reference signal p11 to send the initial transmission of the TB, reference signal p21 for a first retransmission of the TB, and reference signal p31 for the second retransmission of the TB. The base station may assign one or more tuples to the UE. Another example is illustrated in table 414. In tables 412 and 414, two initial transmissions of different TBs on the same time-frequency resources using different 3-tuples will not result in reference signal collision because each 3-tuple uses a different reference signal for its initial transmission. However, some retransmissions may result in reference signal collision because references signals are reused by different tuples, e.g. because there is not enough unique orthogonal reference signals available. An example of reference signal collision is illustrated in FIG. 11, which shows a portion of uplink time-frequency resources 402 from FIG. 9 and a portion of table 412 from FIG. 10. In this example, UE 102a is assigned time-frequency resource pattern 8 and tuple 1, and UE 102b is assigned time-frequency resource pattern 15 and tuple 2. During the same subframe, TB 1 arrives for grant-free uplink transmission at UE 102a and TB 2 arrives for grant-free uplink transmission at UE 102b. There is no reference signal collision for the initial transmission of TB 1 and TB 2 because different reference signals are used and different resource partitions are used. The first retransmission of TB 1 and TB 2 use the same reference signal p21, but there is no collision because different resource partitions are used. However, there is reference signal collision of the second retransmission of TB 1 and TB 2 because both the same resource partition and reference signal p31 is used.

(4) Number of retransmissions. A UE may be configured to perform k retransmission of a TB, which may be autonomous retransmissions or retransmissions in response to a NACK or grant.

In some embodiments, a default resource configuration for a UE is assigned by the base station on a semi-static basis, e.g. using higher layer signaling such as RRC signaling. Secondary resource configurations may also be assigned to the UE, either via higher layer signalling or layer 1 (e.g. DCI) signaling. For example, a UE may be semi-statically assigned "default resource configuration A" and "secondary resource configuration B". Default resource configuration A may specify that the UE is to use time-frequency resource pattern 3, and secondary resource configuration B may specify that the UE is to use time-frequency resource pattern 4. The UE may then use time-frequency configuration A (resource pattern 3) for grant-free uplink transmissions, unless instructed by the base station during operation, using physical layer downlink control signaling, to switch to configuration B (pattern 4). As discussed in embodiments below, the switching from one resource configuration to another may be instructed by the base station in DCI, e.g. using a unified signal format, such as part of multi-bit downlink signaling in a downlink control channel that may include other information, such as HARQ feedback.

In some embodiments, there may be more than one secondary resource configuration. Also, in some embodiments, a resource configuration may include the configuration of multiple resource parameters. Some examples are as follows.

Figure 12:
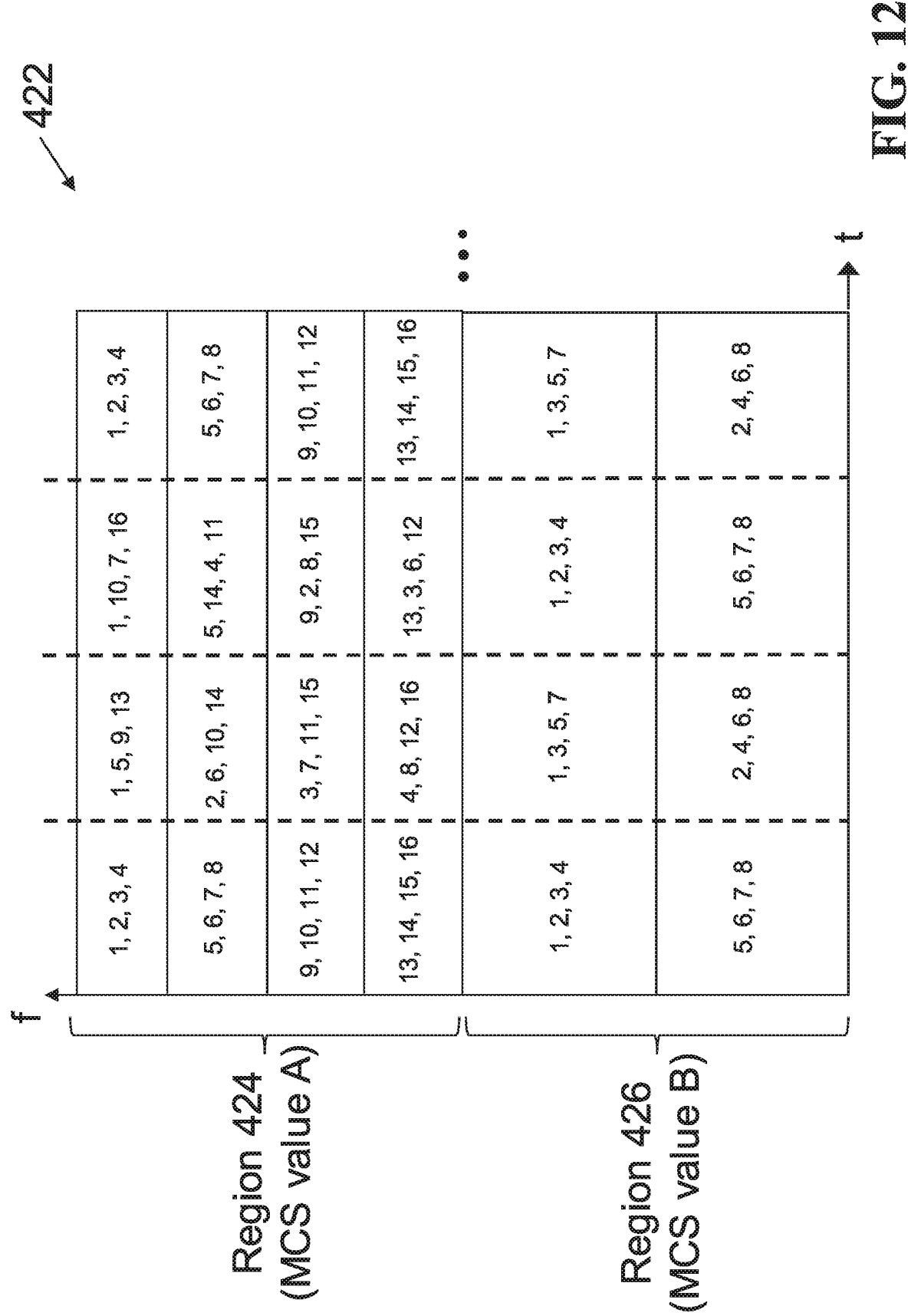
FIG. 12 illustrates a set of uplink time-frequency resources partitioned into different regions based on MCS values.

In one example, a UE has three preconfigured values of MCS: A, B, and C. A may be a large MCS value and C may be a small MCS value. The MCS may implicitly link to the uplink resource partition size needed for the UE to send the uplink transmission. e.g. large MCS value A may mean only one resource partition is used to send the uplink transmission, and small MCS value C may mean two resource partitions are used to send the uplink transmission. In one example, a hopping pattern associated with MCS C may use more partitions or time-frequency resources in a sub-frame compared to that associated with MCS A. In one example, the UE has two preconfigured values of MCS: a default configuration of a large MCS value A, and a secondary configuration of a smaller MCS value B. The uplink frequency band is divided into two MCS based regions, and for each MCS value A or B the region to send the uplink transmission may be explicitly signalled or implicit in the MCS value. Higher layer or layer 1 (DCI) signaling may notify of regions, or how an MCS is associated with a region, or hopping patterns associated with each region. A UE may be associated with one hopping pattern with one MCS in a first region and a second hopping pattern with a second MCS in a second region. In one example, hopping patterns associated with different MCSs can be same or different. As an example, FIG. 12 illustrates a set of uplink time-frequency resources 422 that are partitioned into two regions: region 424 corresponding to MCS value A, and region 426 corresponding to MCS value B, with various time-frequency hopping patterns available in each region. A UE uses MCS value A by default and therefore sends a TB (using MCS value A) in region 424. However, the UE may sometimes be configured in DCI to switch to MCS value B for one or more transmissions, which implicitly means switch to region 426. In some embodiments, the UE is configured to use a particular hopping pattern for each MCS. As one example, UE 102a is configured by the base station in RRC signaling to use MCS A and hopping pattern 3 in region 424 as the default configuration, and use MCS B and hopping pattern 5 in region 426 as the secondary configuration. Then during operation, UE 102a uses MCS A and hopping pattern 3 in region 424, except when UE 102a receives DCI from the base station 100 to switch to the secondary configuration for a single transmission, in which case the UE switches to MCS B and hopping pattern 5 in region 426 for that single transmission and then returns to the default configuration. In another example, during operation UE 102a initially uses MCS A and hopping pattern 3 in region 424, but if UE 102a receives DCI from the base station 100 to switch to the secondary configuration, then UE 102a switches to MCS B and hopping pattern 5 in region 426 and continues with MCS B and hopping pattern 5 in region 426.

In another example, a UE has two preconfigured hopping patterns to use in uplink time-frequency resources: pattern A and pattern B. Pattern A may be the default used by the UE, except when the base station instructs the UE to switch to pattern B using DCI. The patterns may be identified by a pattern index. In some embodiments, a UE may be semi-statically configured with a partition index that identifies a particular time-frequency resource that is to be used by the UE for sending a transmission. The default of the UE may be to not use that partition index, but instead use a hopping pattern, except when the base station signals to the UE in DCI to use the partition index for one particular transmission. The partition index field may be independently configured or sent jointly with other fields, such as the MCS field.

In another embodiment, different uplink time-frequency hopping patterns configured for a UE can be used for different TBs or HARQ processes. For different HARQ process transmissions, a UE may use different hopping patterns or the same hopping patterns. This may depend on whether multiple HARQ processes were initiated in the same subframe or a different subframe. The network may configure the UE to use hopping patterns for different HARQ process such that they may not collide in a common partition during their course of transmission. Same or different reference signals can be used for different HARQ processes. A HARQ process may use the same hopping pattern during the course of its transmission, or multiple hopping patterns may be used for transmission(s) of a HARQ process. Switching from one hopping pattern to another during the course of transmission of a HARQ process can be UE initiated or can be based on signaling from the base station. A UE may be configured to switch time-frequency partitions based on some semi-static configuration, for example, after the third re-transmission of a HARQ process, the UE may switch to a different hopping pattern.

In another example, a UE has multiple preconfigured reference signals, e.g. reference signals A, B, C, and D. Reference signal A is the default reference signal used by the UE for uplink transmissions. In some embodiments, A. B. C, and D may instead be tuple indices, e.g. the UE may be configured by default to use 3-tuple 1 in table 414 of FIG. 10, and may be configured to instead use 3-tuples 2, 3, or 4 when a particular indication is sent from the base station in DCI during operation.

In another example, a UE may be configured with at least a reference signal which may be associated with one or more densities. Higher layer or layer 1 (DCI) signaling is provided to the UE to notify which density the UE is to use/assume for that reference signal. A reference signal is mapped to a group of resource elements (REs). In one example of density, the reference signal is mapped to one OFDM symbol at the beginning of the subframe. In another example, the reference signal is mapped to a later OFDM symbol in the subframe. In another example, the reference signal is mapped to multiple OFDM symbols, where one OFDM symbol can be at the beginning and another near the end or middle of the subframe. Signaling can be provided to the UE to switch from a low density to high density reference signal pattern, for example to ensure higher reliability in high speed scenarios or to control pilot collision in a better manner. Mapping reference signals to multiple symbols allows the reference signal to be longer, and more orthogonal reference signal sequences can be used. Reference signal configuration A can have one or multiple patterns or densities associated with it. Alternatively, configuration A may refer to lower density and configuration B may refer to higher density. Layer 1 or RRC signaling may notify the UE if a higher/lower density reference signal compared to the current one needs to be used for a given duration.

In another example, the UE may be preconfigured to perform n repetitions of a TB, where n is preconfigured to be non-negative integer value A, B, or C. n=A may be the default, but the UE may be instructed using DCI during operation to switch to n=B or n=C for some of the time. Initial transmissions may be configured with a certain number of repetitions, and retransmission after HARQ feedback may be configured with a different number of repetitions.

In another example, the UE may be preconfigured to transmit at certain power levels/steps, e.g. power level A, B. and C, where A is the default transmission power level. The power level may be stepped to level B and C using a control signal in DCI during operation.

In another example, the UE may be preconfigured to use a certain numerology. For example, a UE may be preconfigured to use a normal cyclic prefix (CP) length by default and use extended CP when a particular control signal is received in DCI during operation. In some embodiments, separate grant-free regions can be identified and used by the UEs for different numerologies. The switch of grant-free region can be explicitly signaled in DCI or implicit in the DCI instruction to switch numerology.

In all of the examples above, the preconfigured resources may be semi-statically preconfigured using higher layer signalling (e.g. RRC signaling). Not all of the preconfigured resource values need be semi-statically changed at the same time.

Although the resources may be semi-statically preconfigured, during operation the base station may send DCI that instructs the UE to switch between the different preconfigured resources, e.g. switch from default resource value A to secondary resource value B and vice versa.

Modifying Resource Configuration Using DCI

A grant-free uplink transmission sent by a UE that uses default preconfigured resource parameters may not always result in successful transmission due to different factors, such as fading or interference in the channel or reference signal collision. Therefore, as mentioned above, the base station may transmit DCI to instruct the UE to switch between the different preconfigured resources, e.g. to try to avoid a pilot collision or to try to avoid fading or interference. It may be the case that some UEs support the use of DCI to switch between different preconfigured resources, whereas other UEs do not support such functionality. The discussion below applies to UEs that have the capability to switch between different preconfigured resources based on DCI from the base station. A unified DCI signaling format is described later that may be used for different UEs having different capabilities.

In some embodiments, HARQ feedback, such as ACK/NACK signaling in DCI, may be augmented to include resource re-configuration instructions in the form of a resource configuration update. For example, a NACK may be augmented with additional bits that indicate changes regarding which reference signal or a reference signal with what density and/or time-frequency pattern and/or MCS to use for a retransmission. "Multi-level" HARQ feedback may be sent by the base station, i.e. multibit downlink control signaling sent as part of DCI that includes both HARQ feedback (e.g. a single bit for ACK/NACK), along with additional bits signaling a reconfiguration of resources. In some embodiments, the multi-level HARQ feedback may be sent in any one of the three DCI formats discussed earlier: UE specific DCI, group-common DCI (e.g. group common PDCCH), or as part of a dedicated downlink acknowledgement channel (e.g. in a PHICH). In some embodiments, for each TB, control/feedback signaling comprising m bits for HARQ feedback and resource reconfiguration may be configured, where m may notified/indicated in higher layer signaling, such as in RRC signaling. The value m may be different for different UEs and may or may not include a resource reconfiguration update. For example, for UE 102*a* m may equal 1: a single bit sending ACK/NACK feedback. For UE 102*b* m may equal 3: a first bit for ACK/NACK feedback and the other two bits for signaling one of four possible resource reconfigurations (e.g. changing the reference signal used and/or the MCS used, etc). In some embodiments, the m-bit feedback may be regarded as an implicit grant for retransmission using the resource reconfiguration specified in the m-bit feedback, assuming the m-bit feedback specifies more than just ACK/NACK feedback. In some embodiments, the m bits may signal HARQ feedback on a CBG basis, e.g. as in example 282 of FIG. 3.

In some embodiments, the HARQ feedback on a CBG basis may be present in both grant-based and grant-free modes of operation. For example, if UE-specific DCI is used for a grant-based re-transmission, the UE-specific DCI may contain a field (like in example 282 of FIG. 3) indicating information related to the status of decoding of the CBGs and/or which CBGs the UE needs to send again.

A. Group Common DCI for HARQ Feedback and/or Resource Configuration

A group-common DCI may be sent every K symbols or slots, or every X ms. A group-common DCI is for multiple UEs. The monitoring period can be cell-specific or group-specific or UE-specific and may be configured. In some embodiments, the location of group DCI is not tied to the beginning of a slot, rather it can be any OFDM symbol and it is configurable. The common PDCCH may have UE specific fields or common information that is read by all UEs that monitor the common PDCCH. X and/or K may be configured by higher layer signalling. In one example, a group DCI targeting a group of UEs is sent every K1 symbols, whereas another group DCI targeting a different group of UEs is sent every K2 symbols. How UEs are grouped to monitor different group DCIs can be based on transmission parameters and/or performance requirements. For example, a group of UEs configured with n1 repetitions may observe a group DCI, whereas another group of UEs with a different number of repetitions monitor a different group DCI. A UE may monitor multiple group DCIs, for example, for resource re-configuration, the UE monitors different group DCIs depending on over which time-frequency resource set the UE is transmitting over a given duration. Separate group DCI can be sent in a subframe for different sub-bands/BW parts configured in a carrier BW.

Figure 13:
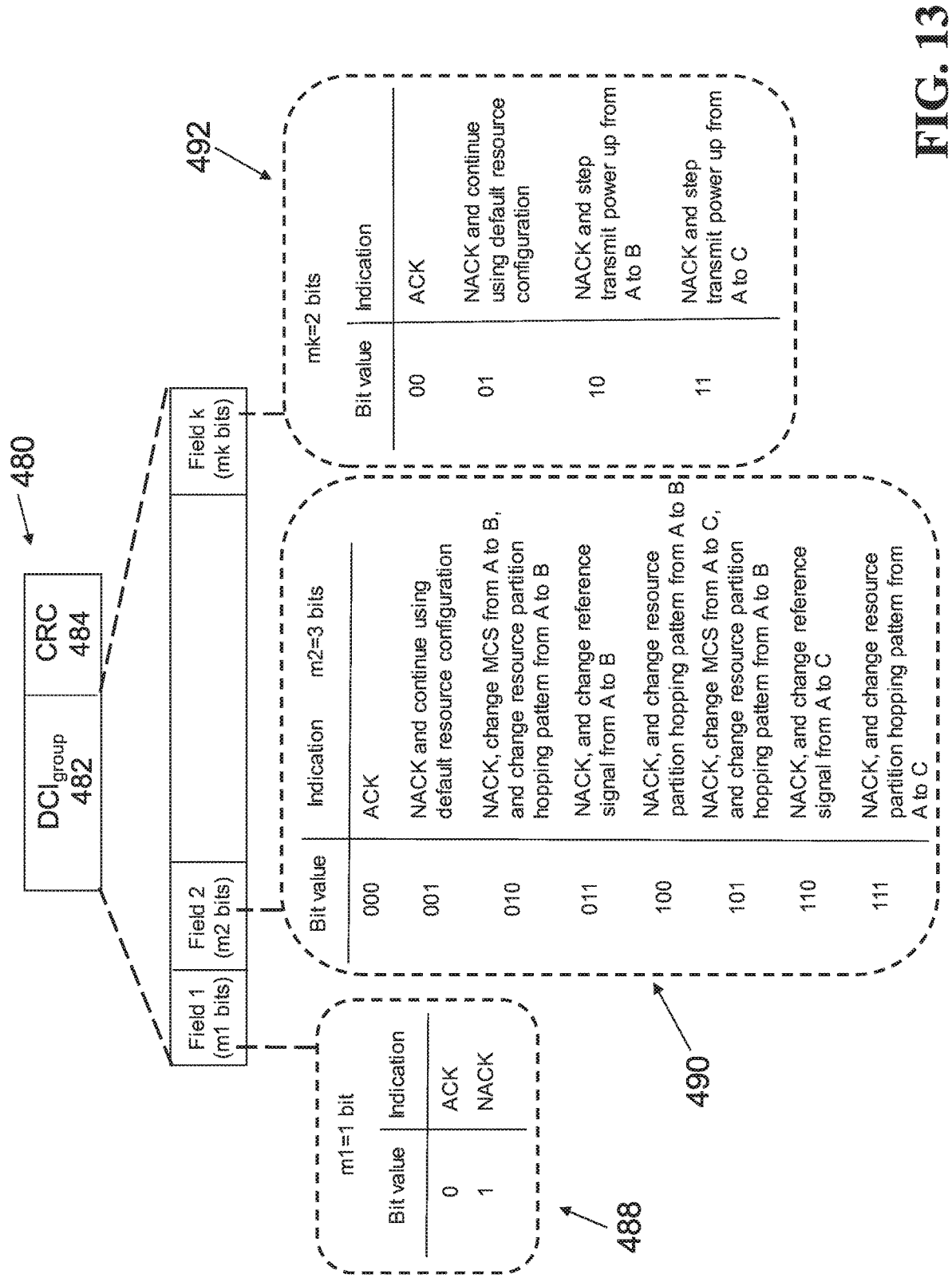
FIG. 13 illustrates a group common DCI message, according to one embodiment.

FIG. 13 illustrates a group common DCI message 480, according to one embodiment. The group common DCI message 480 may be transmitted in a downlink control channel in the manner described earlier in relation to FIG. 7. The group common DCI includes group DCI, labelled $DCI_{group}$ 482, as well as a CRC 484 masked by a group ID in the form of a G-RNTI. The group includes k UEs, including UEs 102a-c. The $DCI_{group}$ 482 has k fields, each field corresponding to a respective UE in the group. Field 1 is m1 bits long, field 2 is m2 bits long, . . . , and field k is mk bits long. In general m1, m2, . . . , and mk may all be different values, although they may also be the same, i.e. m1=m2= . . . =mk=m bits. An example of field 1 is illustrated, which corresponds to a respective one of the UEs (e.g. UE 102a). Field 1 is m1=1 bit long, which is a bit indicating an ACK or a NACK for a previous uplink transmission, as shown in table 488. The UE corresponding to field 1 may not support resource reconfiguration via multi-level feedback in the DCI, which is why m1=1 and ACK/NACK is sent. An example of field 2 is also illustrated, which corresponds to another respective one of the UEs (e.g. UE 102b). Field 2 is m2=3 bits long, and different patterns of the 3 bits instruct different things to the UE, as shown in table 490. An example of field k is also illustrated, which corresponds to another respective one of the UEs (e.g. UE 102c). Field k is mk=2 bits long, and different patterns of the 2 bits instruct different things to the UE, as shown in table 492. Although not shown in FIG. 13, the HARQ feedback may be on a CBG basis instead, which may require more bits (e.g. one bit for each CBG). In one embodiment, the UE corresponding to field 1 has table 488 stored as a look up table (LUT) in its memory, the UE corresponding to field 2 has table 490 stored as a LUT in its memory, and the UE corresponding to field k has table 492 stored as a LUT in its memory. The LUTs are also stored at the base station 100 and may be communicated to the corresponding UEs using higher layer signaling, e.g. when setting the default and secondary resource configurations. Which bit combination refers to what may be notified to the UE via higher layer signalling, or the UE may receive such information during the initial access procedure.

FIG. 13 is just an example. Many different possible resource configurations may be signaled instead. Different resource reconfiguration signaling can be combined with HARQ feedback. As one example, the two bits in table 492 may instead signal a change in number of repetitions only. As another example, '010' in table 490 may not need to explicitly signal changing the resource partition hopping pattern from 'A' to 'B' because that may be implicit based on the change in MCS.

In some embodiments, multiple group common DCI messages may be sent in a single TTI, e.g. to different groups of UEs. For example, the frequency resources of a TTI may be separated into two different subbands. In a first subband a first group of UEs send uplink transmissions, and in a second subband a second group of UEs send uplink transmissions. N subframes later two group common DCI messages corresponding to that TTI are transmitted in the downlink: a first group common DCI message for the first group of UEs, and a second group common DCI message for the second group of UEs. Having UEs separated into different groups based on the subband in which they transmit in a TTI, rather than having one group for all UEs transmitting in the TTI (regardless of the subband) means the presence of multiple shorter group common DCI messages, rather than one longer group common DCI message. However, overhead may be saved in cases in which no UEs in a given subband transmit in the TTI, because the group common DCI message corresponding to the given subband would not need to be transmitted from the base station. If the UEs transmitting in a TTI are separated into different groups, the group separation does not have to be based on the subband in which the UEs transmits. The group separation may be based on one or more other parameters instead, e.g. based on the UE ID, the MCS used for the uplink transmission, the transmit power used, the number of configured repetitions etc.

In some embodiments, the timing between the uplink transmission and the location of the group common DCI message is configurable. For example, a group common DCI message corresponding to an uplink TTI may be sent in the downlink N TTIs after the uplink TTI, where N may be configured by the base station, e.g. on a semi-static basis. For example, if N was configured to be equal to three, then after sending an uplink transmission on an uplink TTI, the UE would look in the downlink three TTIs later to find the group common DCI message associated with that uplink transmission. In some embodiments, RRC signaling may notify the UE of the TTI index in the uplink for which a later group common DCI message applies.

In some embodiments, if the group common DCI is not sent every TTI, then higher layer signaling will notify the UE of the connection of TTI/SF index and how it relates to an upcoming group common DCI. It may be possible that every three SF, group DCI is sent. In that case, ACK/NACK could be based on a group of transmission (initial transmission with some repetitions instead of single transmission).

In some embodiments, a UE has a field in the group DCI, which may include feedback for one or multiple HARQ processes if active. If the UE has an active HARQ process ongoing, then it monitors the group DCI, otherwise the UE does not monitor the group DCI. Association of UE to a field in group DCI is configured via RRC signalling.

If there is no fixed association configured before, then some rule can be used by the UEs, i.e., a field can be used by different UEs at different times. For a given time, UE finds the field in the next DCI based on a rule, which can be based on one or more of the following: TTI index of transmission, partition, hopping pattern, transmission parameters, MCS, number of repetitions, number of active HARQ processes of a UE, whether the HARQ processes are initiated at the same time or different TTIs etc.

Figure 14:
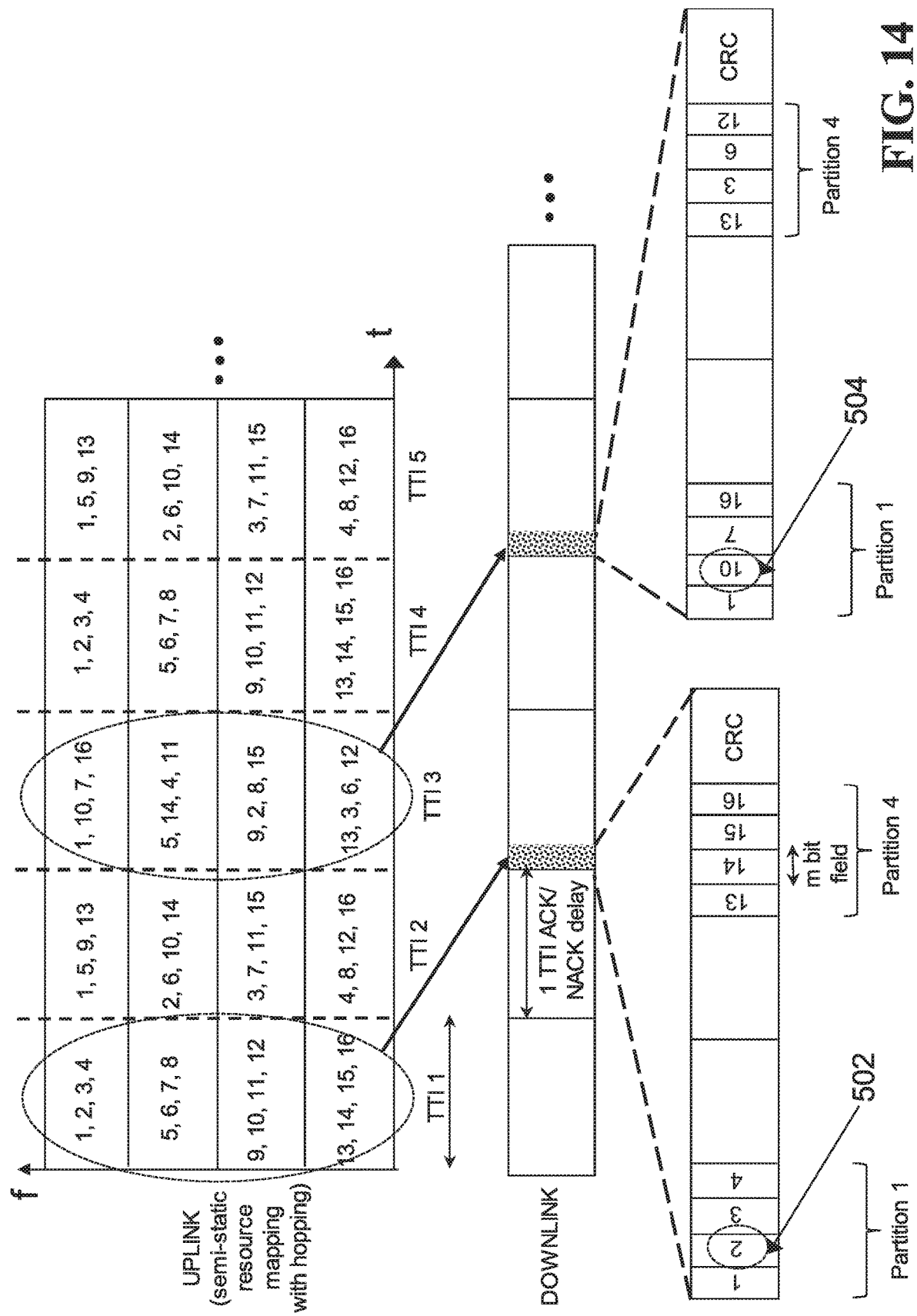
FIG. 14 illustrates a mapping of UEs to fields of group common DCI, according to one embodiment.

Various mechanisms are possible in implementation for mapping UEs to fields in the $DCI_{group}$ 482. For example, higher layer signaling, such as RRC signaling, may indicate to a UE which field in the $DCI_{group}$ 482 corresponds to that UE. The mapping of UEs to fields may be changed semi-statically. As another example, the mapping may be based on the resource partition and uplink time-frequency resource pattern being used by the UE. For example, FIG. 14 illustrates a mapping of UEs to fields of a group common PDCCH DCI according to one embodiment. The group common DCI message has a one TTI delay in the downlink channel, and the UE-to-DCI field mapping depends upon the uplink time-frequency resource pattern being used by the UE. For example, the second field 502 of the group common DCI message corresponding to TTI 1 maps to the UE using pattern 2 in TTI 1, whereas the second field 504 of the group common DCI message corresponding to TTI 3 maps to the UE using pattern 10. Therefore, a UE using a particular pattern knows that the group common DCI for its transmission in TTI n is present in the downlink at TTI (n+2), and the field location in the group common DCI depends upon the resource partition and virtual position of the pattern in TTI n.

In another example, each hopping pattern has an associated field in the group common DCI. The UE knows which hopping pattern index the UE is using. In that case, every TTI can have fields 1 to 16 and no shuffling of pattern indices would be necessary. Regardless of which partition the UE is in, the UE just finds the field corresponding to the pattern the UE is using. This may be useful if the UE is using two patterns simultaneously for two packets. The UE goes to the respective fields for patterns to find feedback information for the TBs. If the network supports the coexistence of L hopping patterns, it may configure group DCI with L fields.

In the embodiment described with respect to FIG. 14, there is a single group common PDCCH for M×K grant-free UE transmissions. The group common PDCCH message has K partitions/fields, and each partition has M further divisions, each division corresponding to a field of one or more bits (m bits in general, where m can be different for each field). In FIG. 14, M=K=4. In one embodiment, a preconfigured offset is RRC signaled to a UE, which the UE updates based on a semi-static resource mapping over the TTIs. The offset tells the UE which field to go to within a partition in the common PDCCH. This offset is part of a semi-static resource configuration. For example, the UE using pattern 3 looks for the $3^{rd}$ field in partition 1 if it transmits in TTI 1, and it looks for the $2^{nd}$ field in partition 4 if it transmits in TTI 3.

In FIG. 14, the offset between the uplink TTI and the corresponding group common DCI is in terms of TTI interval. Specifically in FIG. 14 the offset is 1 TTI. In an alternative embodiment, the offset may be measured in terms of subframes or number of OFDM symbols. Also the partitions illustrated in the group common DCI may be a logical partition. Also, the downlink portion is illustrated in FIG. 14 as separate from the uplink portion, as if a frequency division duplex (FDD) implementation. However, a time division duplex (TDD) implementation may be used instead, and the description above still applies: the group common DCI would be found in the downlink so many TTIs, subframes, or OFDM symbols in the future compared to the uplink TTI.

Also, the example of FIG. 14 shows that the group common DCI has 16 fields, one for each of the possible 16 UE uplink transmissions in a TTI. However, if in a particular uplink TTI certain UEs did not transmit, then the fields corresponding to those UEs may be omitted in the corresponding group common DCI to try to reduce overhead. That being said, in some embodiments such a dynamic omission may not be possible. In some embodiments, the configured number of fields may be less than number of UEs supported, or the number of configured fields may be related to how many UEs are capable of monitoring the group common DCI. In those cases, not necessarily every hopping pattern or UE will be mapped to a field. The DCI would have fewer fields and some hopping patterns or UEs would be assigned a field, the information for which is notified via RRC signalling or during initial access or via system information.

Also, the uplink time-frequency hopping pattern allows for each of the 16 patterns to transmit each TTI. More generally, this need not be the case. For example, a UE following a particular uplink hopping pattern may only be allowed to transmit every other TTI in alternative (less latency sensitive) embodiments.

Figure 15:
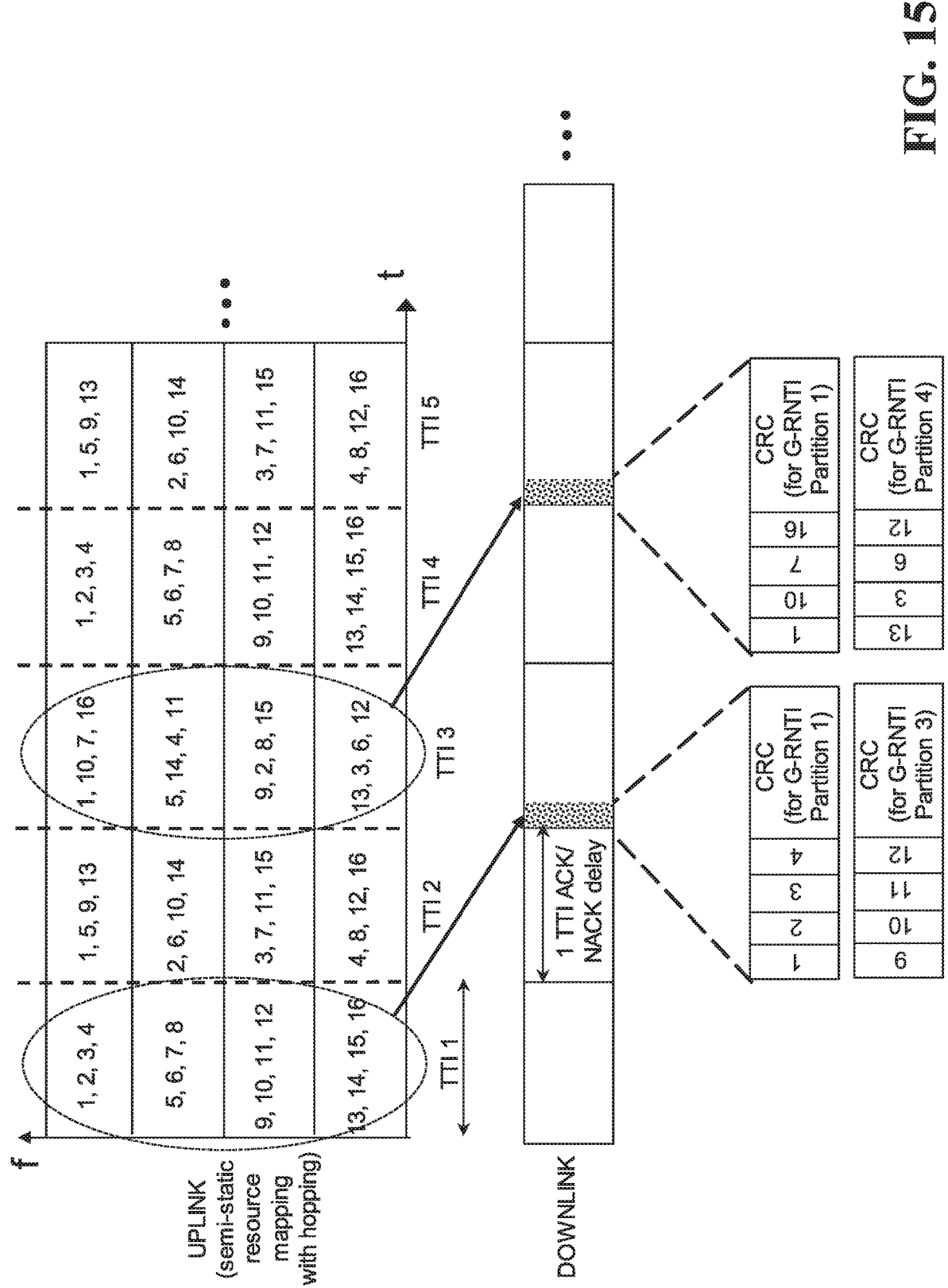
FIGS. 15 to 17 illustrate examples of group common DCI messages.

In FIG. 14, there is a single group common DCI for each uplink TTI interval. All UEs transmitting in the same TTI decode the same group common DCI. FIG. 15 illustrates a variation in which each resource partition in a TTI has its own corresponding group common DCI. The UEs transmitting at a particular resource partition in a particular TTI form their own group having their own group common DCI. A possible benefit of the FIG. 15 embodiment compared to the FIG. 14 embodiment is that overhead may be reduced if not all patterns have uplink transmissions: no group common DCI needs to be transmitted if no UEs transmitted in the corresponding uplink partition. For example, FIG. 15 assumes that only UEs on patterns 1, 2, 3, 4, 9, 10, 11, 12 (partitions 1 and 3) transmitted in TTI 1, and that only UEs on patterns 1, 10, 7, 16, 13, 3, 6, 12 (partitions 1 and 4) transmitted in TTI 3. FIG. 15 may result in PDCCH overhead savings if traffic load is small or moderate. Instead of each resource partition in a TTI having its own corresponding group common DCI, each group of resource partitions or PRBs or frequency subband or bandwidth part may have its own corresponding group common DCI.

In FIG. 15, a group common PDCCH message is configured based on the number of grant-free uplink partitions in an uplink TTI. As part of the system information, each UE may be informed of the number of grant-free partitions, or this may not be necessary (e.g. the UE just knows its partition size and its own hopping pattern). There are 4 possible group common DCI messages sent every TTI since there are 4 frequency partitions each TTI in FIG. 15. A UE knows the partition in which it transmitted, and so the UE just applies the pre-configured offset to identify which field to look for within the common PDCCH message sent for that partition. For example, in FIG. 15, if a UE transmits using pattern 3 in TTI 1, then the UE will look at field 3 in the group common DCI message corresponding to partition 1 in TTI 3. The UE uses the G-RNTI corresponding to partition 1. If the UE also transmits using pattern 3 in TTI 3, then the UE will look at field 2 in the group common DCI message corresponding to partition 4 in TTI 5. The UE uses the G-RNTI corresponding to partition 4.

In some embodiments, if one group common DCI is sent for partition 1 and 2, and another for partition 3 and 4, then mapping of different hopping patterns to each group common DCI may be configured by RRC signalling or system information. A partition is a bandwidth part consisting of a group of PRBs in frequency. A UE can hop from one partition to another in successive TTIs.

In the group common DCI embodiments discussed above, the mapping of pattern indices to uplink time-frequency resource partitions indicates how many uplink transmissions are permitted simultaneously in the partition (e.g. 4 simultaneous uplink transmissions in a resource partition in the figures). However, a resource partition or pattern may not be exclusive to a UE. For example, one UE may have multiple TBs to transmit in the same interval in the same or different partitions. A UE may therefore look to different fields in the same group common DCI message for different TBs or look to different group common DCI messages for different TBs. In another example, resource allocation pattern 3 may be used by different UEs in different times, e.g. if pattern 3 is not uniquely assigned to a particular UE.

In the group common DCI embodiments discussed herein, the shift applied for a UE to find its field in the correct corresponding group common DCI message may be TB specific, i.e. the shift applied is per TB. The shift may be preconfigured, and in some embodiments may be a function of the subframe ID and/or a grant-free resource pattern or the time-frequency resources. In some embodiments, the shift could be determined based on some rule. The rule could be semi-statically signalled and known to both the UE and the network. One UE may apply different amounts of shifts to find the corresponding feedback/control field in the corresponding group common DCI message, e.g. if that UE simultaneously transmitted multiple TBs.

Figure 16:
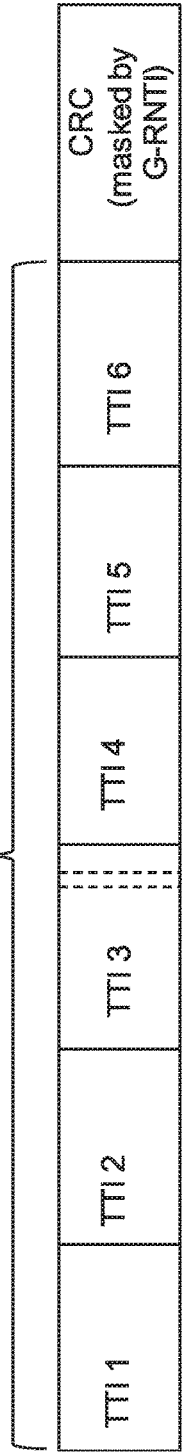

In the group common DCI embodiments discussed in relation to FIGS. 14 and 15, at least one group common DCI is sent in the downlink per TTI, assuming there is at least one uplink transmission per TTI. The field in the group common DCI message is a function of the pattern index. In other embodiments, it may be possible that every N subframes or TTIs a group common DCI message is sent providing feedback/control corresponding to the uplink transmissions of some or all of the N subframes/TTIs before. Feedback/control that corresponds to TBs sent by one or more UEs at different intervals, may be sent in the same interval in one or in multiple group common DCI messages. The mapping of an uplink TB to a field in the group common DCI message may be function of both the subframe index of the uplink TB transmission and the pattern index used for the uplink TB transmission. An example of a group common DCI message 522 is illustrated in FIG. 16. The $DCI_{group}$ corresponds to 6 previous uplink TTIs. The location of a particular field in the $DCI_{group}$ is based on both the TTI in which the uplink TB transmission was sent and/or the pattern used. TTIs 1 to 6 in FIG. 16 need not be contiguous in time, and in general there may be a delay between the end of last TTI and the time at which the group common DCI message is sent. In FIG. 16, the timing of the HARQ feedback is asynchronous. HARQ feedbacks of transmissions occurring over different TTIs before are grouped and sent in the group common DCI. In some embodiments, a group common DCI message may be sent periodically, e.g. every N TTIs or subframes, where N is configurable. For example, a group common DCI message sent at TTI m×N+n, where m=1, 2, . . . provides feedback for all uplink transmissions sent in uplink TTIs (m−1)N to mN. n is an integer greater than or equal to 1 and represents the delay between an uplink TTI and the time required to incorporate feedback from that uplink TTI in a group common DCI message sent in a downlink TTI. In another general example, a group DCI may be sent every N TTIs and it may contain ACK/NACK information of HARQ processes that have occurred over a group of TTIs before a group DCI is monitored.

In another embodiment, one or multiple group common DCI messages containing HARQ feedback and/or resource configuration information may be sent at a configurable period, e.g. every K OFDM symbols or slots. If the one or more group common DCI messages are sent every slot, then the uplink resource hopping pattern indices or uplink resource partition indices may not be used to map to fields in the group common DCI. There may not be any link of number of partitions and common PDCCH construction. In some embodiments, instead of partition/pattern index, the starting RB index of the grant-free resource allocation may be used to map a UE to a field in the common PDCCH. For example, if there are k fields in group common DCI, and i denotes starting RB index of an uplink transmission associated with one of the fields, then mod(i, k)+offset may be used to map the uplink transmission to the field. The offset value is needed to distinguish between starting RB indices that map to the same value in the modulo operation. For example, if k=8, and one field in the group common DCI was associated with an uplink transmission starting at RB index 10 and another a second field in the group common DCI was associated with an uplink transmission starting at RB index 18, then mod(8,10)=mod(8,18)=2. Both uplink transmissions cannot be mapped to the same field, and so different preconfigured offsets are used to ensure the two uplink transmissions map to different fields. The offset can be from 0 to k−1. This rule of mapping to a field may be known to both the UEs and the network, and the rule may be notified via broadcast or unicast higher layer or layer 1 (DCI) signaling.

In some embodiments, it is possible that HARQ feedback/resource reconfiguration of multiple TBs of a UE is notified via the same group common DCI message. The UE may be configured, using RRC signaling, to find corresponding field(s) in the group common DCI to obtain the feedback for each TB. Alternatively, the UE may always receive n-bit feedback if the UE supports up to n simultaneous TB uplink transmissions. Alternatively, HARQ feedback of different TBs are found in different fields, for example, if they are associated with different hopping patterns.

In some embodiments, group DCI in a given TTI may notify HARQ feedback of only one HARQ process of a UE. A UE may support multiple HARQ processes. The UE specific field in the group DCI may contain an identifier of the HARQ process and HARQ feedback information. The identifier notifies the UE which active HARQ process the feedback belongs to. As mentioned above. HARQ feedback bits can be augmented to include resource configuration information. In an example, if a UE-specific field has N bits, there can be P bits used for identifying which HARQ process the feedback belongs to and Q bits that contain HARQ feedback with or without resource configuration updates. HARQ feedback for a process can be 1 bit or more, depending on whether ACK/NACK is sent for a TB or CBGs. If NACK or failure notification of any other kind is received, the HARQ process may keep using the same hopping pattern. Based on UE identification (for example, based on reference signal or a preamble) and partition information, the base station may identify that a new process is initiated. This is because the base station knows which patterns are configured for a UE and what reference signal configurations are supported for that UE. For example, new transmission of a UE can be identified by a reference signal. After identifying the UE in a given partition, the base station can check which hopping pattern(s) supported for that UE allows transmission in that partition. A new transmission of a UE is associated with a HARQ process ID which can be maintained in synchronism by the base station and the UE, after the base station identifies a new transmission. A HARQ process may use a hopping pattern for its active period of transmission, as mentioned above.

In one embodiments, the group DCI may contain a UE specific field which may notify HARQ feedback information of up to L processes for a UE which may support up to K processes, $L<=K$. In that case, the UE specific field would have L identifiers for the processes and HARQ feedback is communicated for each process.

In some embodiments, a field in group DCI is mapped to a hopping pattern. In one example, different active HARQ processes of a UE are mapped to different hopping patterns. A UE can be configured with K hopping patterns. The number of hopping patterns a UE is configured with can be more or equal or less than the number of HARQ processes a UE supports. After ACK of a HARQ process is received or other notification of successful decoding of the HARQ process packet is received, the hopping pattern is released and can be used for a next new transmission.

Figure 17:
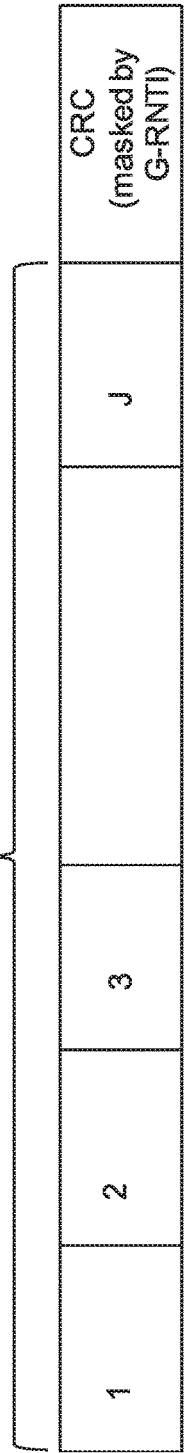

In some embodiments, UEs operating in grant-free mode may be semi-statically enabled to monitor group common DCI (e.g. a common PDCCH). However, in some instances not all UEs may support the reconfiguration of resources using DCI. For example, at a given time only up to J UEs support the reconfiguration of resources using DCI. The rest of the UEs follow their default preconfigured resource assignment. FIG. 17 illustrates J fields in a common PDCCH message 542, each field being UE specific or TB specific (e.g. for a UE that simultaneously transmits multiple uplink TBs) or hopping pattern specific.

As is clear from embodiments above, there are many different possibilities for mapping UEs or uplink TB transmissions to fields in a group common DCI. In some embodiments, the mapping may be agnostic to the hopping pattern and other resources used and just set in advance using higher layer signaling. In other embodiments the mapping may be based on the hopping pattern used and/or the uplink resource partition used and/or the starting RB index used and/or other transmission parameters used (e.g. the MCS used or the reference signal used, etc.).

If multiple HARQ processes are supported for a UE, a rule can be established to find HARQ feedback information of each HARQ process in the group DCI or UE specific DCI. For example, if N HARQ processes are supported, a UE may have an ordering of the HARQ processes. For example, the UE may maintain a sequence of active HARQ processes in the order they are transmitted. If two HARQ processes are transmitted in the same TTI, then frequency domain information can be used (e.g., starting RB indices of the two transmission) to distinguish the two HARQ processes. The base station also updates the UE specific sequence containing information of active HARQ processes whenever it receives a new transmission from the UE. For example, at a given TTI n, a UE has two HARQ processes active, e.g., HARQ process 5 and 6 and up to N=8 processes supported in a given duration of L TTIs for a UE. The base station has received at least one transmission for each of processes 5 and 6. Hence, both the UE and base station are synchronized in ordering/numbering of the active HARQ processes. Next, a new packet arrives at the UE and it increments the process number and refers to this HARQ process as 7. After the base station receives this new transmission, it also adds this process into the sequence of active HARQ processes and numbers this as 7. As mentioned above, by exploiting a UE and/or new transmission identifier, for example reference signal, and/or partition and/or configured hopping patterns for the UE, the base station may know a new transmission for that UE is received. That new transmission can be mapped to a hopping pattern that is different from the ones used by existing active HARQ processes of that UE. After a duration of L TTIs ends, HARQ process numbering resets and the next new transmission would be referred to as process 0. For example, if HARQ process 7 was the last HARQ process initiated in the duration, then the sequence would be 5, 6, 7, 0 if 5, 6, 7 are still active. i.e., ACK or a notification of successful decoding is not received. $Log_2$ N bits can be used in a UE specific grant to indicate for which process a grant for re-transmission is received following an initial transmission, either grant-based or grant-free. Similarly, in group common DCI, a UE-specific field may have $Log_2$ N bits as identifier to indicate for which process the HARQ feedback is received. For supporting simultaneous feedback for multiple HARQ processes, an N bit bitmap may be used in each UE field. Mapping of HARQ ID to bit index may be pre-configured and/or based on a rule such as the one discussed above. For example, if processes 5 and 6 are active, the UE may observe the $5^{th}$ and $6^{th}$ bits in the bitmap to identify the feedback. Other bits may not be relevant.

In one example, a hopping pattern may not include resources every TTI, i.e., the next hopped resource could be after n TTIs. Even though the examples shown above assume frequency division multiplexing (FDM) of partitions, time division multiplexing (TDM) of partitions and TDM+FDM of partitions are also possible. FDM may be more desirable for latency constrained services.

B. UE-Specific DCI for HARQ Feedback and/or Resource Configuration

Figure 18:
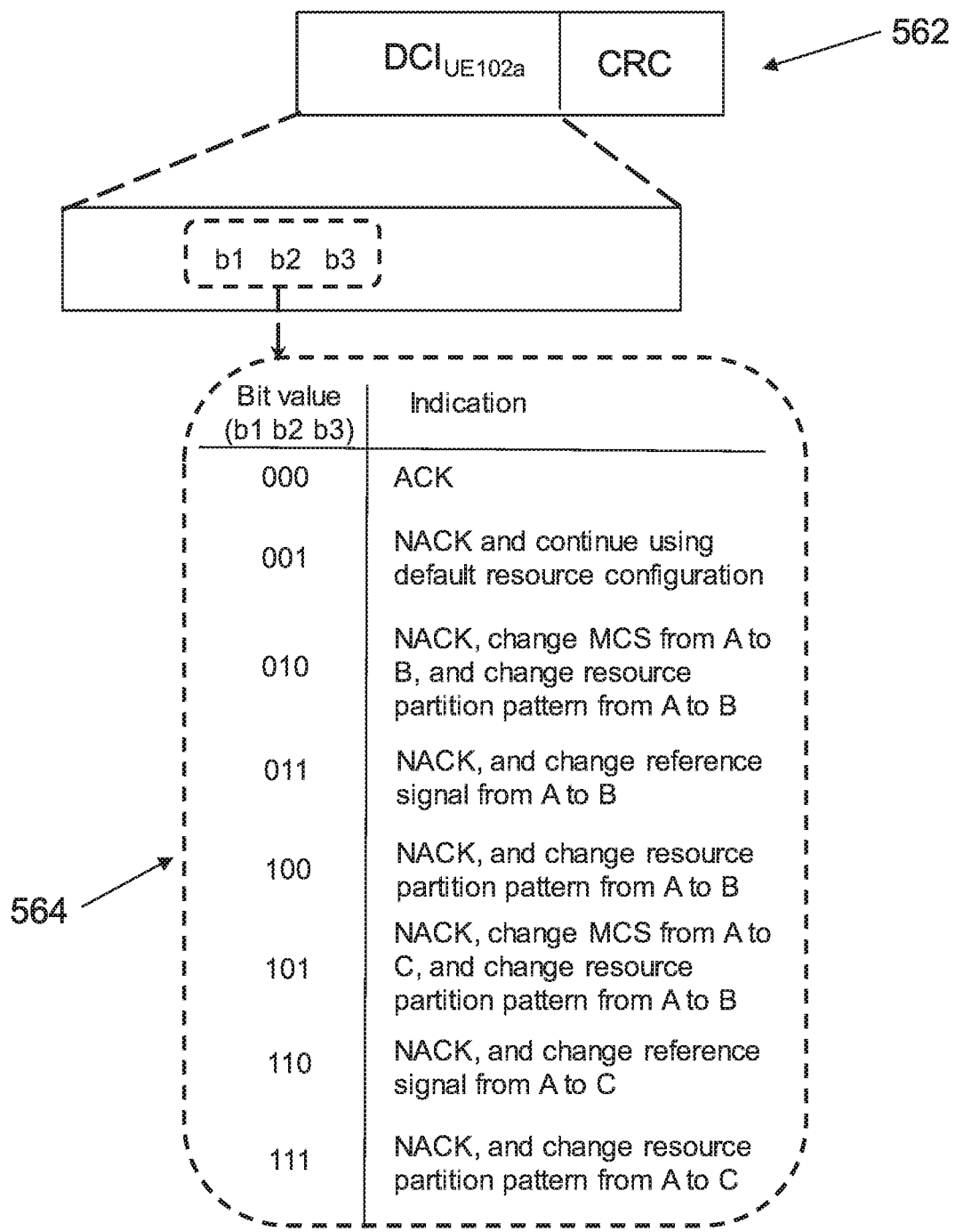
FIG. 18 illustrates UE-specific DCI, according to one embodiment.

Instead of using a group common DCI message, HARQ feedback and/or resource configuration information may be sent in UE-specific DCI. A UE-specific DCI can be used for grant-free or grant-based transmission to provide HARQ feedback and/or resource configuration updates. FIG. 18 illustrates a UE-specific DCI message 562, according to one embodiment. The DCI is specific to UE 102a and is labelled $DCI_{UE102a}$. A 3-bit example is illustrated in FIG. 18 in which different patterns of the 3 bits instruct different things to UE 102a, as shown in table 564. The DCI message has a CRC masked using the UE ID for UE 102a, e.g. as explained earlier in relation to FIG. 6.

In some embodiments, the UE-specific DCI may have a more compact format than DCI traditionally used, e.g. a format similar to "1C type" in LTE. The DCI may be for a re-transmission or an initial transmission (e.g. an initial grant-free uplink transmission). The DCI may only include essential fields. The configuration of the DCI may be notified to the UE in advance through RRC signaling.

Examples of fields that may be included in the UE-specific DCI format include: the time-frequency resource allocation, e.g. partition indices or RB group allocation with or without hopping pattern information; a resource configuration consisting of an m-bit field where different combinations of the m bits allocate different resource configurations, e.g. which reference signal to use, and/or which MCS to use, and/or which RV to use, etc.; a flag to identify the DCI format (size) to the UE; an indication of TDD support; padding; ID information to uniquely identify the UE (e.g. a UE ID, or something else that uniquely identifies the UE on the resources, such as the partition index and/or the hopping pattern and/or the starting RB index and/or reference signal). For example, the reference signal can be used as RNTI to mask the CRC of the UE specific DCI.

In some embodiments, a new UE-specific DCI format may be used that accommodates CBG-based retransmission. For example, if a TB consists of 4 CBGs, then the UE-specific DCI may include 4 bits for ACK/NACKing the 4 CBGs, e.g. the 4 bits shown in stippled bubble 282 of FIG. 3. In some embodiments, the CBG granularity is configurable, i.e. how many CBs constitute a CBG may be configured or reconfigured, semi-statically in higher layer signaling and/or in reconfiguration bits sent in DCI. Once the number of CBs per CBG is configured, then the number of CBGs in a TB can change during operation according to TB size.

Figure 19:
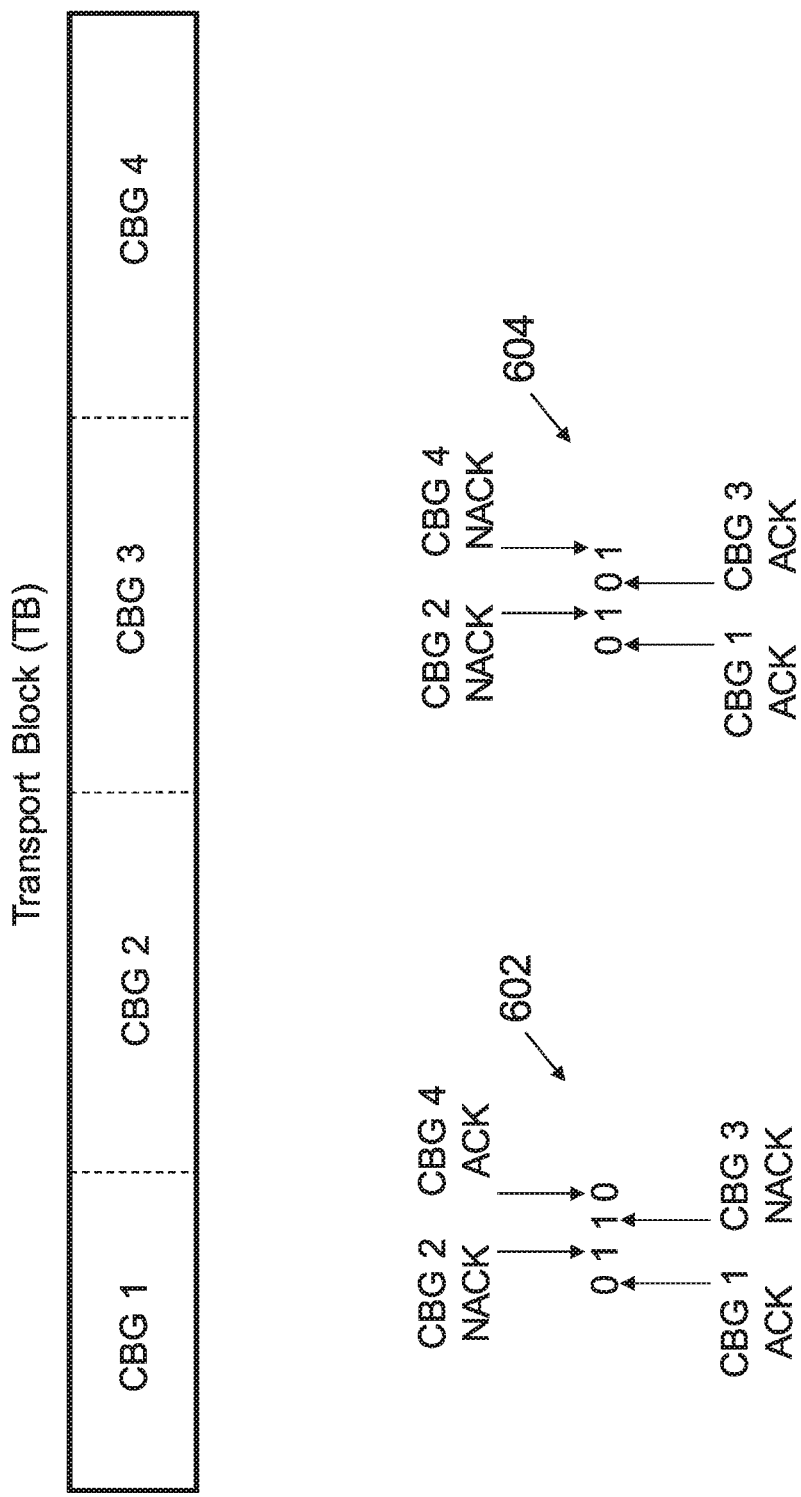
FIG. 19 illustrates CBG-specific HARQ feedback according to different examples.

In some embodiments, the UE may determine how many CBGs of a previously transmitted TB need to be retransmitted based on the resource allocation information in the retransmission grant, e.g. based on the granted MCS and/or the granted RV and/or the granted physical RBs etc. However, the UE may not know exactly which CBGs of the previously transmitted TB need to be retransmitted. One way for the UE to know exactly which CBGs need to be retransmitted is to include in DCI a mapping like that shown in stippled bubble 282 of FIG. 3. For example, assume a TB has four CBGs and decoding of two of the CBGs, by the base station, failed. A retransmission for the failed CBGs may be granted, to the UE, in DCI. The UE may determine from the resource allocation information in the retransmission grant that two CBGs failed, but not which ones. In one embodiment, the DCI therefore includes the 4-bit information shown at 602 in FIG. 19, i.e. indicating that CBGs 2 and 3 failed. In another embodiment, the DCI includes the 4-bit information shown at 604 in FIG. 19. i.e. indicating that CBGs 2 and 4 failed. These bit maps 602 and 604 indicate explicitly which CBGs failed in being decoded by the base station. Alternatively, to try to save overhead, instead of having an m-bit mapping to provide ACK/NACK feedback for m CBGs, $\log_2 m$ bits may instead be used in the DCI to indicate the starting position of CBGs needing to be retransmitted. In the case of bit map 602, m=4 and $\log_2 4$=2 bits are sent instead of the 4 bits shown at 602. The 2 bits sent indicate the starting position of the first CBG requiring transmission, i.e. the starting position of CBG 2. The UE assumes that the CBGs requiring retransmission are contiguous, and so the UE therefore has enough information to perform the correct retransmission because: (i) the UE knows the number of CBGs requiring retransmission from the resource allocation information; and (iii) the UE knows the starting position of the first CBG requiring retransmission. However, in some situations, e.g. in 604, the CBGs requiring retransmission are not contiguous, in which case the base station also grants retransmission of any correctly decoded intervening CBGs to make the retransmitted CBGs contiguous. For example, in the situation corresponding to 604 (CBGs 2 and 4 incorrectly decoded), the base station would send a resource allocation for retransmitting 3 CBGs and would send the starting position of CBG 2, and the UE would send a retransmission for CBGs 2 to 4. An indication of which CBGs failed or are to be re-transmitted can be used in both downlink and uplink grant.

In some embodiments, if only $\log_2 m$ bits are sent to indicate the starting position of the CBG retransmission, then the other m–$\log_2 m$ bits may be used to indicate other instructions to the UE, such as the configuration or reconfiguration of certain resources for the granted retransmission.

Although mechanisms and formats for providing HARQ feedback on a CBG basis are discussed above in the context of UE-specific DCI, the CBG HARQ feedback discussed above may instead be provided in a field of a group common DCI message, or on a dedicated downlink acknowledgement channel. CBG feedback can be associated with resource reconfiguration as well, with more bits added. For example, if a TB had two CBGs, then table 492 in FIG. 13 may be modified to have three bits in the field instead of two. Two of the 3 bits could be used for ACK/NACKing the two CBGs, and the third bit indicating different resource configurations.

C. DCI for HARQ Feedback and/or Resource Configuration Sent in a Dedicated Downlink Acknowledgment Channel In another embodiment, the HARQ feedback and/or resource configuration information specific to a UE may be sent in a dedicated downlink acknowledgement channel, e.g. a PHICH channel or PHICH-like channel.

Figure 20:
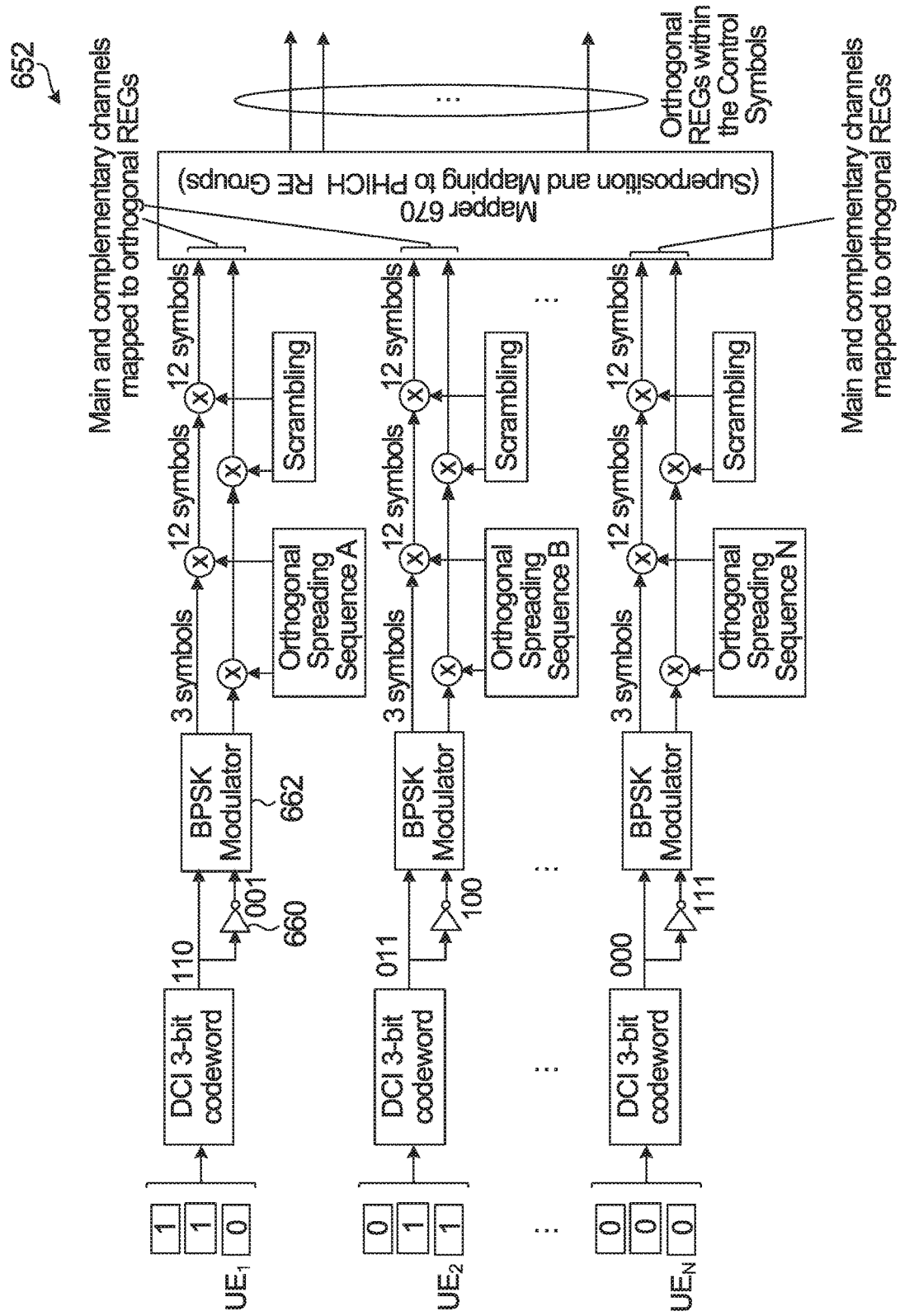
FIGS. 20 to 23 illustrate embodiments of systems for generating and sending DCI in a dedicated downlink acknowledgment channel.

FIG. 20 illustrates an example of circuitry that may be used at the base station for generating a PHICH-like channel for N UEs, where each of the N UEs sent an uplink transmission in a same previous TTI, and where each UE of the N UEs are being sent a 3-bit HARQ feedback/resource reconfiguration bit pattern having the mapping shown in table 564 of FIG. 18. In the example in FIG. 20, UE 1 is being sent HARQ feedback/resource reconfiguration bit pattern '110', UE 2 is being sent HARQ feedback/resource reconfiguration bit pattern 011, and UE N is being sent HARQ feedback/resource reconfiguration bit pattern 000. Each HARQ feedback/resource reconfiguration bit pattern will referred to as a "codeword". A codeword can contain HARQ feedback and/or a resource configuration corresponding to one or multiple HARQ processes of a UE. Hence, a codeword mentioned in the context of notification via a PHICH or PHICH-like channel, can contain same information as indicated in a UE specific DCI or UE specific field in a group DCI, discussed above. Alternatively, each codeword may correspond to a HARQ feedback and/or resource configuration associated with a hopping pattern at a given time.

In FIG. 20, the codeword 110 for UE 1 is inverted by inverter 660 to result in the complement codeword 001. The codeword 110 and its complement 001 are each modulated into 3 BPSK symbols using modulator 662. The same orthogonal spreading sequence A is then applied to both the symbols of the codeword and its complement. The result is the codeword 110 represented by 12 symbols, and a complement of the codeword 001 also represented by 12 symbols. After scrambling, the 12 symbols of the codeword 110 are mapped to a first set of REGs, and the 12 symbols of the complement is mapped to a second set of REGs that is orthogonal to the first set of REGs.

UE 1 knows the downlink subframe in which to find the codeword based on a preconfigured timing relationship. For example, for grant-based embodiments, the location of the downlink acknowledgement channel in which to find the codeword may be based on the timing of the original grant for the uplink transmission, e.g. if the grant is received in downlink subframe w, then the codeword for the granted uplink transmission will be at downlink subframe w+x. As another example, for grant-free embodiments, the location of the downlink acknowledgement channel in which to find the codeword may be based on the grant-free resource access timing, e.g., if a UE sends a grant-free uplink transmission in subframe w, then the codeword for the uplink transmission is sent in subframe w+n. UE 1 knows which REGs to find its codeword 110 and its complement 001 based on the uplink resources used by UE 1 to send the uplink transmission, e.g. based on the starting RB index of the uplink transmission. UE 1 knows to use orthogonal spreading sequence A to decode the codeword 110 and its complement 001 based on the reference signal used by UE 1 to send the uplink transmission corresponding to the codeword. A similar operation occurs for each of UEs 1 to N.

Figure 21:
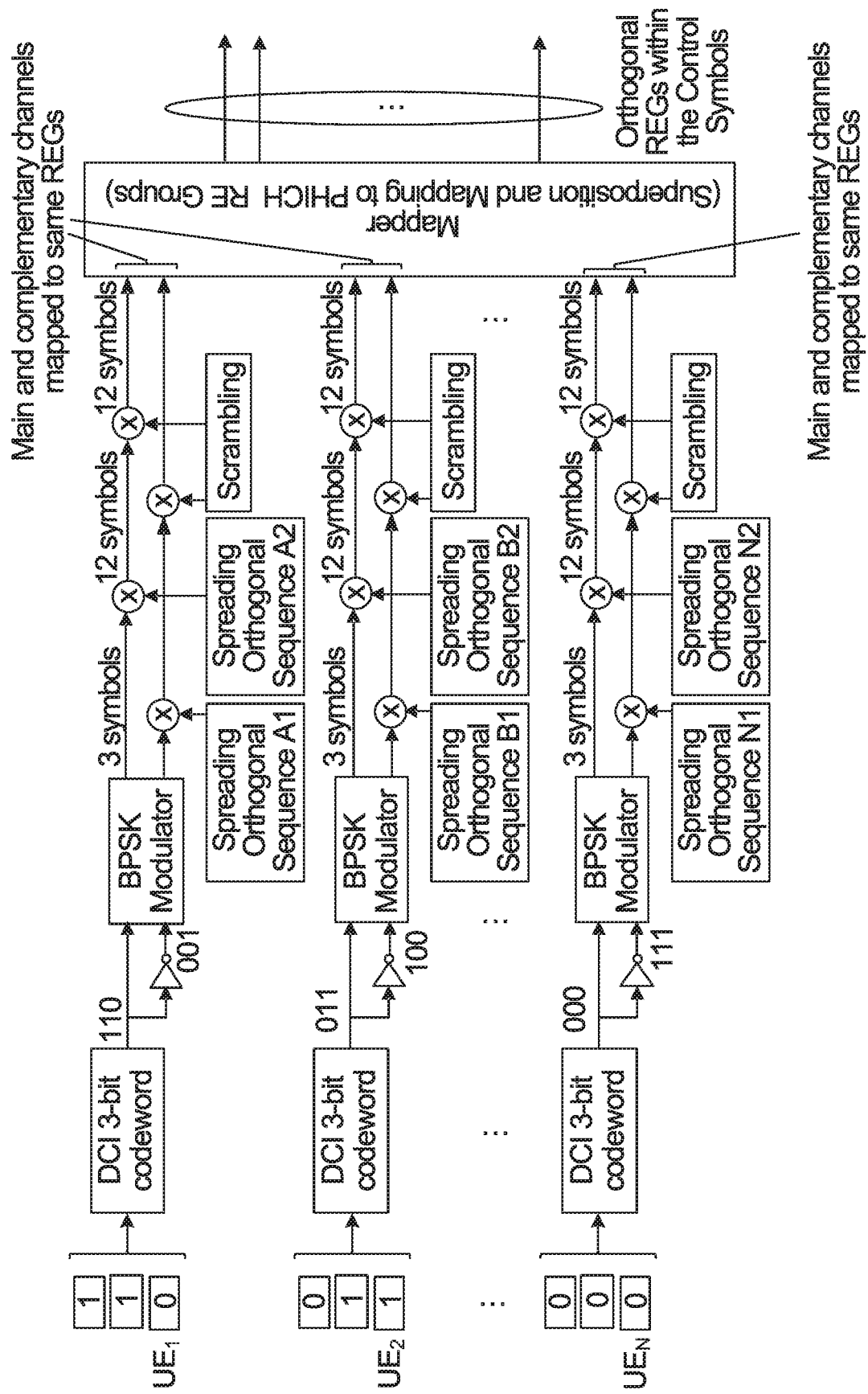

FIG. 21 is a variation of FIG. 20 in which for each codeword, the spreading sequence used for the codeword is orthogonal to the spreading sequence used for the complement of that codeword. That is, spreading sequence A1 is orthogonal to spreading sequence A2, spreading sequence B1 is orthogonal to spreading sequence B2, and spreading sequence N1 is orthogonal to spreading sequence N2. However, each codeword is mapped to the same REGs as its complement. Alternatively, the codeword and its complement may be mapped to REGs that are orthogonal to each other, like in FIG. 20.

Figure 22:
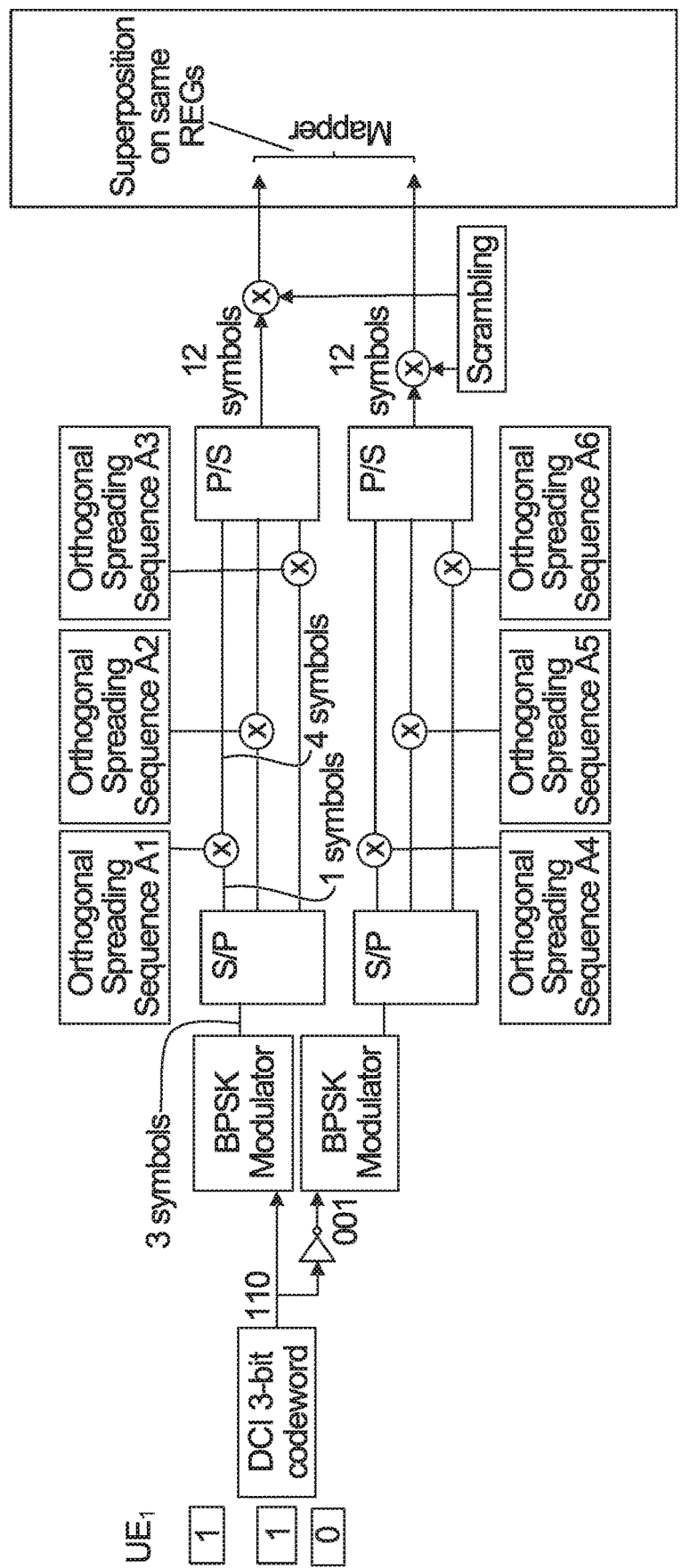

FIG. 22 is a variation of FIG. 21, illustrating that in some embodiments individual bits of a codeword may be spread by different orthogonal spreading sequences. Only the top branch corresponding to UE 1 is shown, and spreading sequences A1 to A6 are orthogonal to each other. Each spread bit is mapped to the same REGs, although this is not necessary. Note that in FIG. 22, the scrambling may instead be applied after the addition of the complementary and main channel. The same applies to FIGS. 20, 21, and 23. Scrambling is cell-specific, not UE specific.

It will be appreciated that many different variations of FIGS. 20 to 22 are possible, e.g. certain bits in a codeword being spread by the same spreading sequence and other bits being spread by different spreading sequences, and some spread symbols being mapped to the same or different REGs.

Figure 23:
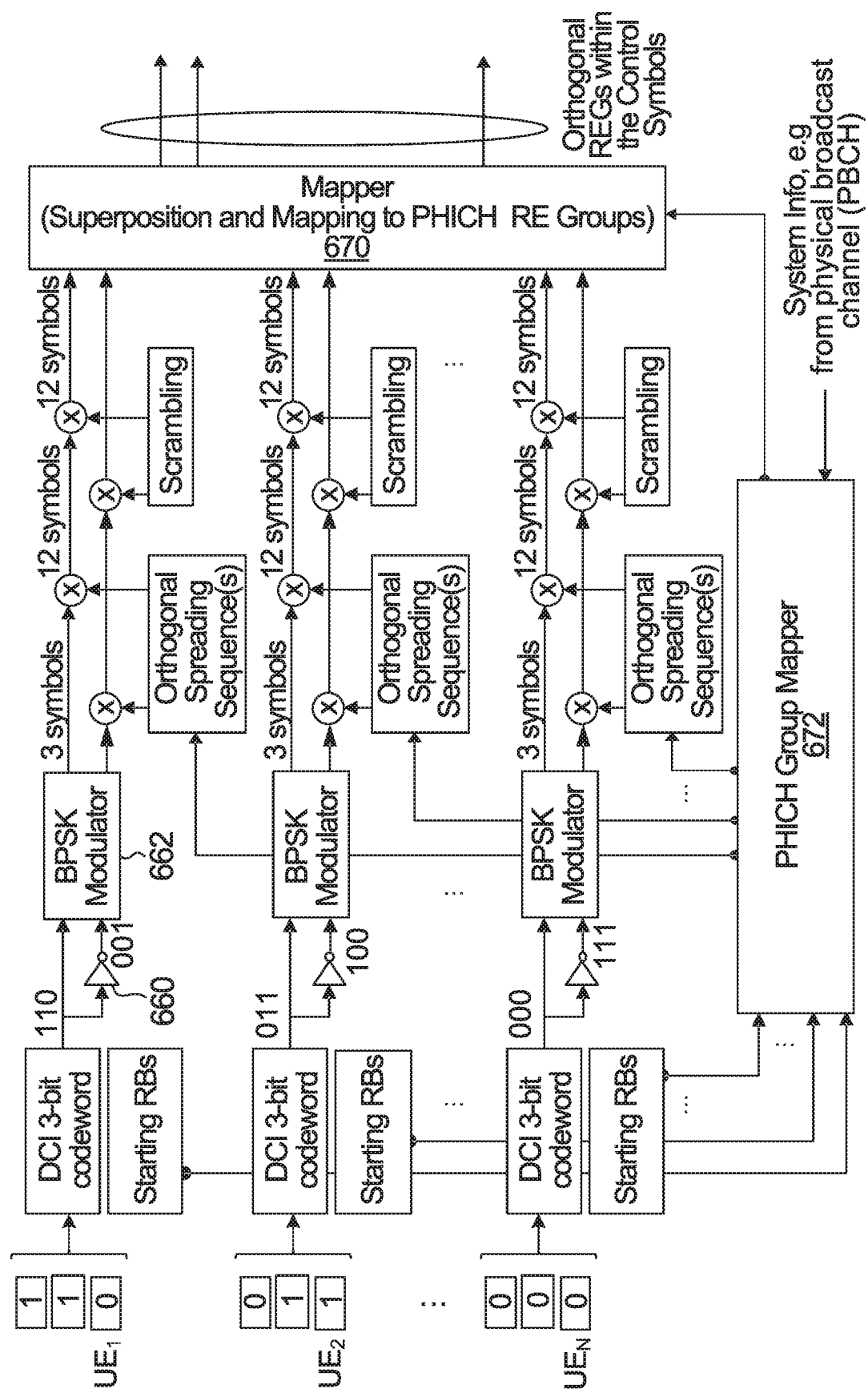

FIG. 23 illustrates a generalization of FIGS. 20 to 22. In general, every UE may be preconfigured differently. For example, the following may be preconfigured: for UE 1, the codeword and its complement are both spread using the same spreading sequence, but the codeword and its complement are mapped to orthogonal REGs; for UE 2, the codeword and its complement are each spread using a different orthogonal spreading sequence, and the codeword and its complement are mapped to the same REGs; for UE N, each bit of the codeword and its complement are each spread using a different orthogonal spreading sequence, and the codeword and its complement are also mapped to orthogonal REGs. This is only an example. In any case, the base station and the UEs are preconfigured in advance to know which one of the possible implementations is to be used. A PHICH group mapper 672 sets which orthogonal spreading sequence(s) to use for each UE and sets the mapping to REGs by mapper 670 possibly based on system information (e.g. from the physical broadcast channel (PBCH)) and/or possibly based on information on the starting RB index for the uplink transmission associated with the feedback.

D. Conclusion

The explanation above in relation to FIGS. 13 to 23 describe different ways in which resource configuration information may be sent to a UE in DCI along with HARQ feedback. The explanation applies to both grant-free or grant-based embodiments. By using DCI to perform resource reconfiguration, the base station may be able to try mitigate the effects of poor channel conditions or interference, or may try to avoid reference signal collision. As an example, the reference signal collision in the second retransmission explained earlier in relation to FIG. 11 may potentially be avoided because the uplink resource configuration module 216 of the base station 100 may anticipate the collision (because the resource hopping patterns are known in advance) and may use the DCI to change the reference signal used by UE 102a for just the second retransmission. As another example, the uplink resource configuration module 216 of the base station 100 may determine that UE 102a is experiencing poor channel conditions and may use the DCI to temporarily decrease the MCS index to provide a more robust MCS. As another example, DCI may be used to temporarily change the resource configuration of a UE from the default resource configuration to a secondary resource configuration in order to provide a possible benefit.

Unified Signaling Format

Different UEs may have different capabilities. For example, UE 102a may be capable of receiving ACK/NACK feedback in DCI, but not capable of receiving a resource reconfiguration update in DCI. e.g. the DCI feedback for UE 102a may be table 488 of FIG. 13. UE 102b may be capable of receiving both ACK/NACK feedback and a resource reconfiguration update in DCI, e.g. as in table 490 in FIG. 13.

Also, some UEs may operate using a semi-persistent scheduling (SPS)-like scheme in which time-frequency resources are granted to the UE in advance using higher layer signaling, such as RRC signaling, but the UE cannot send grant-free uplink transmissions using the granted resources until an activation signal is sent in the physical layer in DCI to the UE. For such UEs, an activation and/or deactivation signal may sometimes need to be communicated, in DCI, from the base station to the UE.

In some embodiments, a unified DCI signaling format in the physical layer may be used for: (i) HARQ feedback, and/or (ii) a resource configuration update, and/or (iii) physical layer activation/deactivation of grant free resources.

Figure 24:
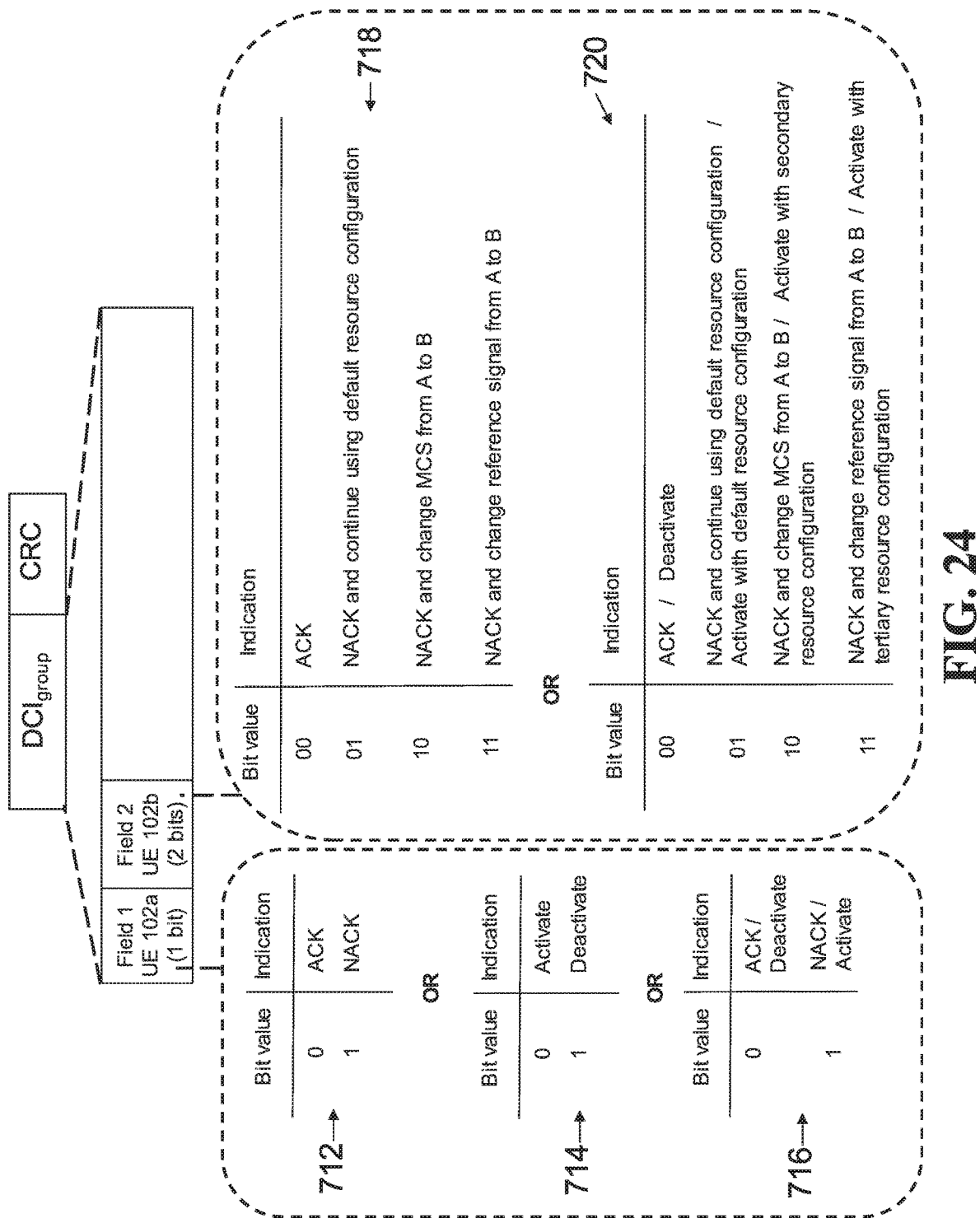
FIG. 24 illustrates a group common DCI message, according to another embodiment.

FIG. 24 illustrates one example of a unified DCI signaling format present in group common DCI. Two fields in the group common DCI are illustrated, the first field corresponding to UE 102a, and the second field corresponding to UE 102b. Field 1 is one bit. The meaning of the one bit is different depending upon the capability of UE 102a. For example, if UE 102a only supports ACK/NACK feedback in DCI, then the one bit indicates ACK or NACK, as shown in table 712. If UE 102a only supports physical layer activation/deactivation of grant free resources in DCI, then the one bit indicates activation or deactivation, as shown in FIG. 714. If UE 102a supports both ACK/NACK feedback in DCI and physical layer activation/deactivation of grant free resources in DCI, then as per table 716: '0' indicates deactivate the resources if there is no ongoing HARQ process for a TB sent from UE 102a, and '0' indicates ACK if there is an ongoing HARQ process for a TB sent from UE 102a; '1' indicates activate the resources if there is no ongoing HARQ process for a TB sent from UE 102a, and '1' indicates NACK if there is an ongoing HARQ process for a TB sent from UE 102a. An ongoing HARQ process occurs from the initial uplink transmission of a TB to the receipt of an ACK for that TB.

Field 2 is two bits. The meaning of the two bits is different depending upon the capability of UE 102b. For example, if UE 102b supports ACK/NACK feedback and resource reconfiguration in DCL then as per table 718: '00' indicates ACK, and the other 2-bit combinations indicate a NACK with a resource configuration update providing instructions regarding which resources to use for the retransmission. If UE 102b additionally supports physical layer activation/deactivation of grant free resources in DCI, then as per table 720: when there is no ongoing HARQ process for a TB sent from UE 102b, then '00' indicates deactivate, and the other 2-bit combinations indicate activate with a particular resource configuration, such that the network may signal a resource configuration update when activating the resources; when there is an ongoing HARQ process for a TB sent from UE 102b, then '00' indicates ACK, and the other 2-bit combinations indicate a NACK with a resource configuration update providing instruction regarding which resources to use for the retransmission.

In some embodiments, the period at which the group common DCI message may be sent is configurable. In some embodiments, the activation/deactivation may be TB level or UE level. For example, multiple TB/HARQ process transmissions may be temporarily deactivated for a UE, with maybe only one uplink TB/HARQ process transmission supported for a period of time. In some embodiments, a deactivation signal also causes the UE to delete from its transmit buffer a previously transmitted TB, if the previously transmitted TB was not deleted in response to the ACK received at the UE for that TB.

As shown in FIG. 24, the same DCI structure may be used for multiple purposes, depending upon the capabilities of the UEs being served by the base station.

FIG. 24 illustrates one example of a unified DCI signaling format in group common DCI. The unified DCI signaling format may instead be sent, for each UE, in UE-specific DCI or in a downlink dedicated acknowledgement channel, such as a PHICH-like channel.

Other Variations and Embodiments

Even though it was assumed that all grant-free transmission intervals are the same, which is a TTI in FIG. 9, it is possible that different UEs may initiate grant-free transmission at any symbol and different UEs may have different transmission intervals. Transmission intervals of different UEs can be overlapping in time and/or frequency. The general mechanisms described herein do not limit to any particular starting position and/or data duration and/or transmission duration.

The specific tables illustrated in FIG. 24 are only an example, and many different variations are possible. As another example, FIG. 25 illustrates other 2-bit combinations that may be sent to UE 102b. In table 722, the feedback for UE 102b instructs activation or deactivation, along with a particular resource configuration for the UE 102b to use for uplink transmissions when activated. The mapping of bit pattern to resource configuration is configured at the UE in advance, e.g. using semi-static signaling. In table 724, the feedback for UE 102b instructs a particular resource configuration for the UE 102b to use for uplink transmissions. The feedback in tables 722 and 724 does not have to be provided in response to an ongoing transmission. e.g. it does not have to be a resource reconfiguration, but may be sent anytime by the base station to tell the UE which resources to use for uplink transmissions.

As mentioned above, a resource configuration may include one or more of the following: MCS, reference signal, hopping pattern, number of repetitions which can be configured to be same or different for initial and re-transmission(s), numerology associated with partition(s) (e.g., different partitions may be configured for transmission with different numerology and a UE may use multiple numerologies during the course of a packet transmission), power, etc. It may also be possible that resource configuration may configure a UE not to use a reference signal in some of the repetitions. For example, if the channel is not changing fast, initial transmission and/or first repetition may contain a reference signal and subsequent autonomous repetitions may not use the reference signal. This can be useful if the UE uses the same partition for a group of repetitions. In one example, an initial transmission configured with 3 repetitions after the first transmission happens in a given partition over consecutive TTIs. Then re-transmission following NACK may occur in a different partition, which can be maintained for another group of repetitions.

Also, the unified DCI signaling format described above in relation to FIG. 24 may not be used if the UEs being addressed by the base station have the same capability. Two specific examples are as follows: (1) The UEs being addressed by the base station all support activation/deactivation. Therefore, the DCI feedback for each UE may only be one bit: '0' for activate and '1' for deactivate (or vice versa). (2) The UEs being addressed by the base station are to have their resources configured (or reconfigured if an uplink transmission is ongoing). The DCI for each UE is 2 bits having the mapping shown in table 724.

In one alternative example in connection with FIG. 24, each UE specific field would have more bits if a HARQ process identifier is included. In an example, if the UE supports multiple HARQ processes and monitors ACK/NACK feedback, an N-bit bitmap can be used in each UE field for N HARQ processes. As mentioned above, mapping of a HARQ process to bit index can be semi-statically configured. An example of how HARQ processes are numbered/identified and a sequence of active processes are maintained is provided above. If the UE also monitors activation/deactivation, each of the bits can be used for activation/deactivation as well, an example of which is provided in 716 in FIG. 24. For example, if there is no active HARQ process for a UE, then all 1's can mean activation of the grant-free resources. In another example, a group of 1's may refer to a group activation of a certain number of HARQ processes permitted for a period of time, and the rest of the bits could be 0's. In another example, a UE may have multiple fields in the DCI in FIG. 24, one for a TB or HARQ process. Which TB or HARQ process of a UE maps to which field can be configured via higher layer signaling or based on some rule, some examples of which are discussed above. In another example, there may not be any UE specific field and instead, each field can be used for a hopping pattern. A UE can be configured with one or multiple hopping patterns and hence, a UE may monitor multiple fields in the DCI. In that case, each hopping pattern may be activated or deactivated. Each hopping pattern may be associated with a resource configuration update. A UE may receive multiple resource configuration updates, for example, when a hopping pattern is being used for one HARQ process. It should be understood that FIG. 24 is only an example of how unification can be achieved via a single DCI. All the examples mentioned above can be applicable in constructing a field in the unified DCI.

More generally, the DCI feedback for a UE may serve one, some, or all of the following purposes:
a) sending ACK/NACK feedback only;
b) sending activation/de-activation only;
c) a) and b) together;
d) a) with a resource reconfiguration;
e) b) with a resource reconfiguration;
f) a resource configuration and/or reconfiguration only;
g) some or all of a) to f) signaled using a common format. e.g. the unified format described above in relation to FIG. 24.

In one example, there can be a separate group DCI that notifies activation/deactivation only, for the UEs that are configured to monitor it. The activation/deactivation can be applied to all or part of the resources configured for a UE. Activation/deactivation may enable/disable some hopping pattern for a given duration. For example, based on load and/or controlling collision, more or fewer number of hopping patterns can be enabled compared to the default/existing one. A separate DCI for activation/deactivation can be useful if a unified DCI causes lot of overhead. In one example, the group DCI that notifies activation/deactivation may not have a UE specific field and may be common to a group of UEs. It may be a group DCI for enabling/disabling entire grant-free resources. In another example, if grant-free resources have five partitions, group DCI may notify activation/deactivation of a selected number of partitions out of all the partitions that is used for grant-free transmission in a TTI. The UEs that are configured to transmit over those partitions monitor the DCI. In one example, a 5 bit bitmap can be used to indicate activation/deactivation of the five partitions. If some partitions are disabled, then a UE may use a hopping pattern that does not include the disabled partition. Some resource configuration updates may notify the UE of different hopping patterns if needed, or based on which partitions are active, a UE may be configured to use a hopping pattern that spans other partitions, excluding the disabled one(s). In one example, the group DCI may notify enabling/disabling of at least one sub-band or bandwidth part out of all the sub-bands or bandwidth parts configured for grant-free transmission or used in uplink spectrum (e.g., the uplink bandwidth can be divided into several sub-bands or bandwidth parts). In FIG. 9, there are four bandwidth partitions configured.

In one example, grant-based UEs may monitor activation/deactivation signaling of grant-free resources. In some cases, grant-free resources can be configured in overlapping fashion with resources where grant-based traffic can be scheduled and/or uplink control information may be sent and/or scheduling requests may be sent. Monitoring grant-free resources activation/deactivation by both grant-free and/or grant-based UEs may enable dynamic sharing of overlapping resources.

In one example, a separate group DCI can be used for sending ACK/NACK only, supporting one or multiple HARQ processes of a UE.

In one example, a group DCI can be used for resource configuration updates only.

Depending on UE capability and UE configuration, one UE may then monitor multiple group DCIs, for example, it monitors one DCI for ACK/NACK and another DCI for activation/deactivation. The two DCIs can have different periodicity of monitoring.

The DCI feedback discussed herein (e.g. for the options a) to g) in the list above) may be for grant-based and/or grant-free uplink transmissions. The DCI feedback discussed herein (e.g. for the options a) to g) in the list above) may be sent in a group common DCI message. UE-specific DCI messages, or a dedicated downlink acknowledgment channel, such as a PHICH-like channel. If different DCIs are used for signaling different content, then a UE may monitor multiple DCIs, e.g., one of activation/deactivation, another for ACK/NACK, etc. UEs may be semi-statically configured to monitor a DCI. In some examples, a UE may monitor a group DCI sending ACK/NACK only after a HARQ process is initiated. DCI notifying activation/deactivation and/or a resource configuration update may be monitored even if the UE does not have an active HARQ process.

Even though group DCI is mentioned here as an option to signal HARQ and/or resource configuration and/or activation/deactivation of resources for uplink transmission, some of the properties of group DCI discussed herein can be applicable to any other applicable cases where signaling via group DCI can be beneficial.

Methods

Figures 26, 27:
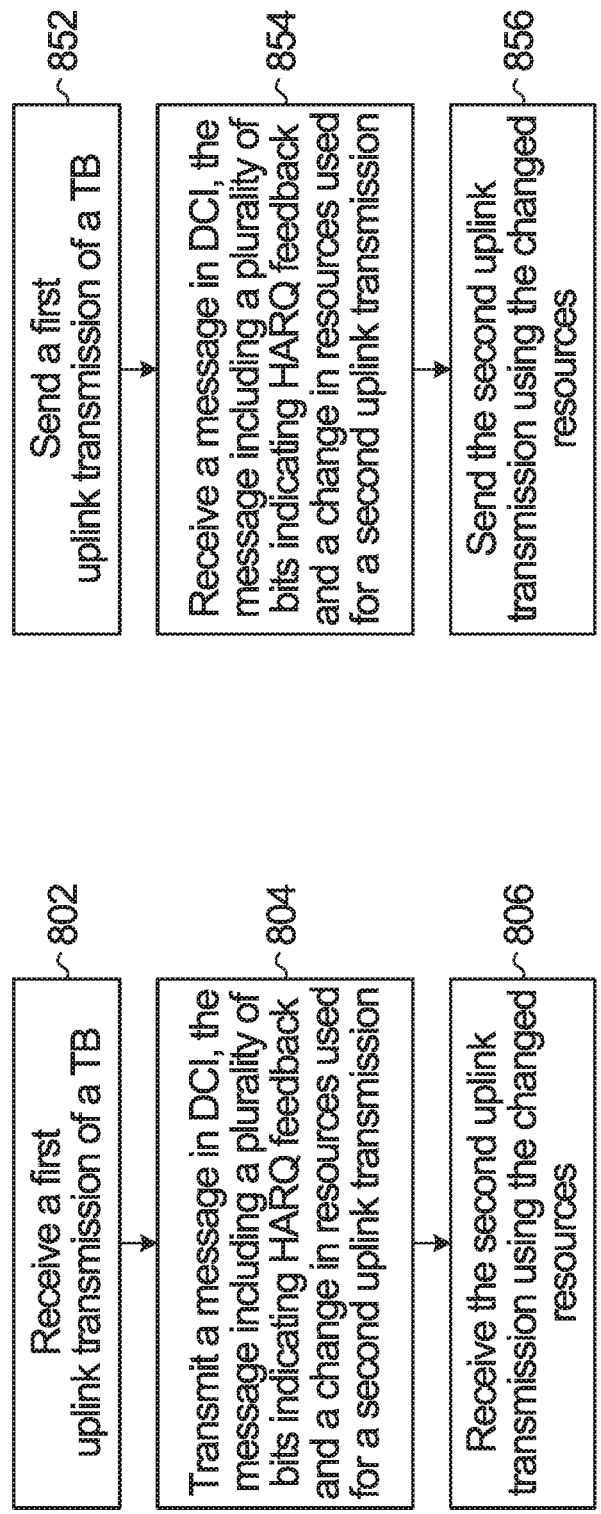
FIG. 26 is a flowchart of a method performed by a base station, according to one embodiment.
FIG. 27 is a flowchart of a method performed by a UE, according to one embodiment.

FIG. 26 is a flowchart of a method performed by base station 100, according to one embodiment. In step 802, the base station receives a first uplink transmission of a TB from UE 102a. In step 804, the base station transmits a message to the UE in DCI. The message includes a plurality of bits. The bits indicate both HARQ feedback corresponding to the TB and a change in resources used by the UE for a second uplink transmission. In step 806, the base station receives the second uplink transmission from the UE using the changed resources.

FIG. 27 is a flowchart of a method performed by a UE 102a, according to one embodiment. In step 852, the UE 102a sends a first uplink transmission of a TB to base station 100. In step 854, the UE 102a receives a message in DCI. The message includes a plurality of bits. The bits indicate both HARQ feedback corresponding to the TB and a change in resources to be used by the UE for a second uplink transmission. In step 856, the UE 102a sends the second uplink transmission using the changed resources.

EXAMPLES

In view of, and in addition to the above, the following examples are disclosed.

Example 1

A method performed by a base station comprising: receiving a first uplink transmission of a transport block (TB) from a user equipment (UE); and transmitting a message to the UE in downlink control information (DCI), the message comprising a plurality of bits indicating HARQ feedback corresponding to the TB and indicating a change in resources to be used by the UE for a second uplink transmission.

Example 2

The method of example 1, wherein the HARQ feedback is a NACK, the second uplink transmission is a retransmission of the TB, and the bits indicate both the NACK and the change in resources, compared to the first uplink transmission, to be used for the retransmission of the TB.

Example 3

The method of example 1 or example 2, wherein the bits indicate a change in at least one of: a reference signal to be used by the UE, a time-frequency hopping pattern to be used by the UE, an MCS to be used by the UE, a transmit power to be used by the UE, and a number of retransmissions to be sent by the UE.

Example 4

The method of any one of examples 1 to 3, wherein the message is in a field of a group common DCI message.

Example 5

The method of example 4, wherein the UE is a first UE, and the method comprises: receiving a plurality of uplink transmissions from a plurality of UEs, the plurality of UEs including the first UE; generating the group common DCI message to have a plurality of fields, each field corresponding to a respective one of the UEs, and each field at least providing HARQ feedback to the respective UE, wherein one of the fields corresponds to the first UE and includes the plurality of bits; transmitting the group common DCI message.

Example 6

The method of example 5, wherein generating the group common DCI message comprises masking at least a portion of the group common DCI message using a group identification (ID) known to the plurality of UEs.

Example 7

The method of example 6, wherein the group common DCI message includes a cyclic redundancy check (CRC), and wherein the CRC is masked by the group ID.

Example 8

The method of any one of examples 1 to 7, wherein the HARQ feedback comprises multiple bits indicating HARQ feedback in relation to at least two code block groups (CBGs) of the TB.

Example 9

The method of any one of examples 1 to 3, wherein the message is transmitted in UE-specific DCI.

Example 10

The method of any one of examples 1 to 3, wherein the message is transmitted in a dedicated downlink acknowledgement channel.

Example 11

A base station comprising: a processor; and a computer readable storage medium storing programming for execution by the processor, the programming including instructions to perform steps in accordance with a method in any one of examples 1 to 10.

Example 12

A base station comprising: a receiver to receive a first uplink transmission of a transport block (TB) from a user equipment (UE); a downlink control signaling module generate downlink control information (DCI) comprising a message, the message including a plurality of bits indicating HARQ feedback corresponding to the TB and indicating a change in resources to be used by the UE for a second uplink transmission; a transmitter to transmit the message.

Example 13

A method performed by a user equipment (UE) comprising: sending a first uplink transmission of a transport block (TB) to a base station; receiving a message in downlink control information (DCI), the message comprising a plurality of bits indicating HARQ feedback corresponding to the TB and indicating a change in resources to be used by the UE for a second uplink transmission.

Example 14

The method of example 13, wherein the HARQ feedback is a NACK, the second uplink transmission is a retransmission of the TB, and the bits indicate both the NACK and the change in resources, compared to the first uplink transmission, to be used for the retransmission of the TB.

Example 15

The method of example 13 or example 14, wherein the bits indicate a change in at least one of: a reference signal to be used by the UE, a time-frequency hopping pattern to be used by the UE, an MCS to be used by the UE, a transmit power to be used by the UE, and a number of retransmissions to be sent by the UE.

Example 16

The method of any one of examples 13 to 15, wherein the message is in a field of a group common DCI message.

Example 17

The method of example 16, wherein the UE is a first UE, and wherein the group common DCI message has a plurality of fields, each field corresponding to a respective one of a plurality of UEs, the plurality of UEs including the first UE, and each field at least providing HARQ feedback to the respective UE, wherein one of the fields corresponds to the first UE and includes the plurality of bits.

Example 18

The method of example 17, wherein at least a portion of the group common DCI message is masked using a group identification (ID) known to the plurality of UEs.

Example 19

The method of example 18, wherein the group common DCI message includes a cyclic redundancy check (CRC), and the CRC is masked by the group ID.

Example 20

The method of any one of examples 13 to 19, wherein the HARQ feedback comprises multiple bits indicating HARQ feedback in relation to at least two code block groups (CBGs) of the TB.

Example 21

The method of any one of examples 13 to 15, wherein the message is received in UE-specific DCI.

Example 22

The method of any one of examples 13 to 15, wherein the message is received in a dedicated downlink acknowledgement channel.

Example 23

A user equipment (UE) comprising: a processor, and a computer readable storage medium storing programming for execution by the processor, the programming including instructions to perform steps in accordance with a method in any one of examples 13 to 22.

Example 24

A user equipment (UE) comprising: a transmitter to send a first uplink transmission of a transport block (TB) to a base station; a receiver to receive a message in downlink control information (DCI), the message comprising a plurality of bits indicating HARQ feedback corresponding to the TB and indicating a change in resources to be used by the UE for a second uplink transmission.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a base station comprising:
receiving a first grant-free uplink transmission of a transport block (TB) from a user equipment (UE); and
transmitting a message to the UE in downlink control information (DCI), the message comprising a plurality of bits indicating hybrid automatic repeat request (HARQ) feedback of a negative acknowledgement (NACK) corresponding to the TB and indicating a change in resources, compared to resources used by the first grant-free uplink transmission, to be used by the UE for a second grant-free uplink transmission, the second grant-free uplink transmission being a retransmission of the TB.

2. The method of claim 1, wherein the bits indicate a change in at least one of: a reference signal to be used by the UE, a frequency partition to be used by the UE, a time-frequency hopping pattern to be used by the UE, a modulation and coding scheme (MCS) to be used by the UE, a redundancy version (RV) to be used by the UE, a transmit power to be used by the UE, and a number of retransmissions to be sent by the UE.

3. The method of claim 1, wherein the UE is a first UE, wherein the message is in a first field of a group common DCI message, and wherein the method further comprises:
receiving a plurality of uplink transmissions from a plurality of UEs, the plurality of UEs including the first UE;
generating the group common DCI message to have a plurality of fields, each field corresponding to a respective one of the UEs, and each field at least providing HARQ feedback to the respective UE, wherein one of the fields is the first field and corresponds to the first UE and includes the plurality of bits; and
transmitting the group common DCI message.

4. The method of claim 3, wherein higher layer signaling is used to preconfigure each one of the plurality of UEs to be mapped to a respective one of the fields, and wherein the first UE is mapped to the first field based on at least one of: frequency partition used by the first UE for an uplink transmission, hopping pattern followed by the first UE, and time-resources used by the first UE for the uplink transmission.

5. The method of claim 3, wherein the plurality of UEs includes a second UE that is different from the first UE, wherein a second field of the fields corresponds to the second UE, wherein the first field is different from the second field, wherein the first field indicates one of a first set of possible changes in resources to be used by the first UE, wherein the second field indicates one of a second set of possible changes in resources to be used by the second UE, and wherein the first set of possible changes in resources is smaller than the second set of possible changes in resources.

6. The method of claim 1, wherein the message is transmitted in UE-specific DCI.

7. The method of claim 6, wherein multiple HARQ processes are supported for the UE, wherein the message includes simultaneous feedback for the multiple HARQ processes, and wherein a rule is used to locate, in the message, HARQ feedback information for each one of the multiple HARQ processes.

8. A base station comprising:
a receiver to receive a first grant-free uplink transmission of a transport block (TB) from a user equipment (UE);
a downlink control signaling module to generate downlink control information (DCI) comprising a message, the message including a plurality of bits indicating hybrid automatic repeat request (HARQ) feedback of a negative acknowledgement (NACK) corresponding to the TB and indicating a change in resources, compared to resources used by the first grant-free uplink transmission, to be used by the UE for a second grant-free uplink transmission, the second grant-free uplink transmission being a retransmission of the TB; and
a transmitter to transmit the message.

9. The base station of claim 8, wherein the bits indicate a change in at least one of: a reference signal to be used by the UE, a frequency partition to be used by the UE, a time-frequency hopping pattern to be used by the UE, a modulation and coding scheme (MCS) to be used by the UE, a redundancy version (RV) to be used by the UE, a transmit power to be used by the UE, and a number of retransmissions to be sent by the UE.

10. The base station of claim 8, wherein the UE is a first UE, wherein the message is in a first field of a group common DCI message, and wherein:
the receiver is further to receive a plurality of uplink transmissions from a plurality of UEs, the plurality of UEs including the first UE;
the downlink control signaling module is to generate the group common DCI message to have a plurality of fields, each field corresponding to a respective one of the UEs, and each field at least providing HARQ feedback to the respective UE, wherein one of the fields is the first field and corresponds to the first UE and includes the plurality of bits; and
the transmitter is to transmit the group common DCI message.

11. The base station of claim 10, wherein higher layer signaling is used to preconfigure each one of the plurality of UEs to be mapped to a respective one of the fields, and wherein the first UE is mapped to the first field based on at least one of: frequency partition used by the first UE for an uplink transmission, hopping pattern followed by the first UE, and time-resources used by the first UE for the uplink transmission.

12. The base station of claim 10, wherein the plurality of UEs includes a second UE that is different from the first UE, wherein a second field of the fields corresponds to the second UE, wherein the first field is different from the second field, wherein the first field indicates one of a first set of possible changes in resources to be used by the first UE, wherein the second field indicates one of a second set of possible changes in resources to be used by the second UE, and wherein the first set of possible changes in resources is smaller than the second set of possible changes in resources.

13. The base station of claim 8, wherein the message is for transmission in UE-specific DCI.

14. The base station of claim 13, wherein multiple HARQ processes are supported for the UE, wherein the message includes simultaneous feedback for the multiple HARQ processes, and wherein a rule is used to locate, in the message, HARQ feedback information for each one of the multiple HARQ processes.

15. A method performed by a user equipment (UE) comprising:
sending a first grant-free uplink transmission of a transport block (TB) to a base station; and
receiving a message in downlink control information (DCI), the message comprising a plurality of bits indicating hybrid automatic repeat request (HARQ) feedback of a negative acknowledgement (NACK) corresponding to the TB and indicating a change in resources, compared to resources used by the first grant-free uplink transmission, to be used by the UE for a second grant-free uplink transmission, the second grant-free uplink transmission being a retransmission of the TB.

16. The method of claim 15, wherein the bits indicate a change in at least one of: a reference signal to be used by the UE, a frequency partition to be used by the UE, a time-frequency hopping pattern to be used by the UE, a modulation and coding scheme (MCS) to be used by the UE, a redundancy version (RV) to be used by the UE, a transmit power to be used by the UE, and a number of retransmissions to be sent by the UE.

17. The method of claim 15, wherein the UE is a first UE, wherein the message is in a first field of a group common DCI message, wherein the group common DCI message has a plurality of fields, each field corresponding to a respective one of a plurality of UEs including the first UE, and each field at least providing HARQ feedback to the respective UE, and wherein one of the fields is the first field and corresponds to the first UE and includes the plurality of bits.

18. The method of claim 17, wherein higher layer signaling is used to preconfigure the first UE to be mapped to the first field, and wherein the first UE is mapped to the first field based on at least one of: frequency partition used by the first UE for an uplink transmission, hopping pattern followed by the first UE, and time-resources used by the first UE for the uplink transmission.

19. The method of claim 17, wherein the plurality of UEs includes a second UE that is different from the first UE, wherein a second field of the fields corresponds to the second UE, wherein the first field is different from the second field, wherein the first field indicates one of a first set of possible changes in resources to be used by the first UE, wherein the second field indicates one of a second set of possible changes in resources to be used by the second UE, and wherein the first set of possible changes in resources is smaller than the second set of possible changes in resources.

20. The method of claim 15, wherein the message is received in UE-specific DCI.

21. The method of claim 20, wherein multiple HARQ processes are supported for the UE, wherein the message includes simultaneous feedback for the multiple HARQ processes, and wherein a rule is used to locate, in the message, HARQ feedback information for each one of the multiple HARQ processes.

22. A user equipment (UE) comprising:
a transmitter to send a first grant-free uplink transmission of a transport block (TB) to a base station; and
a receiver to receive a message in downlink control information (DCI), the message comprising a plurality of bits indicating hybrid automatic repeat request (HARQ) feedback of a negative acknowledgement (NACK) corresponding to the TB and indicating a change in resources, compared to resources used by the first grant-free uplink transmission, to be used by the UE for a second grant-free uplink transmission, the second grant-free uplink transmission being a retransmission of the TB.

23. The UE of claim 22, wherein the bits indicate a change in at least one of: a reference signal to be used by the UE, a frequency partition to be used by the UE, a time-frequency hopping pattern to be used by the UE, a modulation and coding scheme (MCS) to be used by the UE, a redundancy version (RV) to be used by the UE, a transmit power to be used by the UE, and a number of retransmissions to be sent by the UE.

24. The UE of claim 22, wherein the UE is a first UE, wherein the message is in a first field of a group common DCI message, wherein the group common DCI message has a plurality of fields, each field corresponding to a respective one of a plurality of UEs including the first UE, and each field at least providing HARQ feedback to the respective UE, and wherein one of the fields is the first field and corresponds to the first UE and includes the plurality of bits.

25. The UE of claim 24, wherein higher layer signaling is used to preconfigure the first UE to be mapped to the first field, and wherein the first UE is mapped to the first field based on at least one of: frequency partition used by the first UE for an uplink transmission, hopping pattern followed by the first UE, and time-resources used by the first UE for the uplink transmission.

26. The UE of claim 24, wherein the plurality of UEs includes a second UE that is different from the first UE, wherein a second field of the fields corresponds to the second UE, wherein the first field is different from the second field, wherein the first field indicates one of a first set of possible changes in resources to be used by the first UE, wherein the second field indicates one of a second set of possible changes in resources to be used by the second UE, and wherein the first set of possible changes in resources is smaller than the second set of possible changes in resources.

27. The UE of claim 22, wherein the message is in UE-specific DCI.

28. The UE of claim 27, wherein multiple HARQ processes are supported for the UE, wherein the message includes simultaneous feedback for the multiple HARQ processes, and wherein a rule is used to locate, in the message, HARQ feedback information for each one of the multiple HARQ processes.

* * * * *